US012668532B2

(12) United States Patent
Choi et al.

(10) Patent No.: US 12,668,532 B2
(45) Date of Patent: Jun. 30, 2026

(54) GLASS HAVING VISUAL INTERNAL ROUGHNESS AND METHOD FOR MANUFACTURING SAME

(71) Applicant: INDUSTRY-UNIVERSITY COOPERATION FOUNDATION KOREA AEROSPACE UNIVERSITY, Goyang-si (KR)

(72) Inventors: Yong Gyu Choi, Goyang-si (KR); Ji In Lee, Seoul (KR); Se Young Ko, Paju-si (KR)

(73) Assignee: INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 118 days.

(21) Appl. No.: 18/677,093

(22) Filed: May 29, 2024

(65) Prior Publication Data

US 2024/0308903 A1     Sep. 19, 2024

Related U.S. Application Data

(63) Continuation of application No. PCT/KR2022/018590, filed on Nov. 23, 2022.

(30) Foreign Application Priority Data

Nov. 30, 2021   (KR) ......................... 10-2021-0168855
Nov. 10, 2022   (KR) ......................... 10-2022-0149499

(51) Int. Cl.
*C03C 21/00*          (2006.01)

(52) U.S. Cl.
CPC ........ *C03C 21/008* (2013.01); *C03C 2203/52* (2013.01)

(58) Field of Classification Search
None
See application file for complete search history.

(56) References Cited

U.S. PATENT DOCUMENTS

2006/0075783 A1*   4/2006   Kim ...................... C03C 21/008
                                                                   65/60.5
2010/0047554 A1*   2/2010   Rajala ................... C03C 23/007
                                                                   428/323
(Continued)

FOREIGN PATENT DOCUMENTS

DE              1913497 A1    11/1969
KR    10-2014-0096145 A       8/2014
(Continued)

*Primary Examiner* — David Sample
(74) *Attorney, Agent, or Firm* — Bridgeway IP Law Group, PLLC; Jihun Kim

(57)          ABSTRACT

This chemically tempered glass is manufactured by preparing a slurry or paste including a salt solution of a second ion to undergo ion exchange with a first ion inside a glass, applying the slurry or the paste onto the surface of the glass to form a coating film, drying the coating film formed of the slurry or the paste on the surface of the glass, differently forming the distribution of the precipitation phase of a salt of the second ion on the surface of the glass, and heat-treating the glass on which the coating film is formed, to thereby form visual internal roughness which is provided between a first surface and a second surface of the glass, which face each other, to induce the diffuse reflection and/or scattering of light traveling through the first surface or the second surface.

18 Claims, 32 Drawing Sheets

(56) References Cited

U.S. PATENT DOCUMENTS

| | | | |
|---|---|---|---|
| 2010/0165454 | A1 | 7/2010 | Suetsugu et al. |
| 2012/0134025 | A1 | 5/2012 | Hart |
| 2015/0239772 | A1* | 8/2015 | Baker ...................... C03C 4/02 |
| | | | 428/410 |
| 2016/0318796 | A1* | 11/2016 | Masuda ................. C03C 17/32 |
| 2017/0263894 | A1* | 9/2017 | Lee ....................... H10K 71/60 |
| 2020/0017406 | A1* | 1/2020 | Wilson ................. C03C 21/002 |

FOREIGN PATENT DOCUMENTS

| | | | |
|---|---|---|---|
| KR | 10-2018-0116566 | A | 10/2018 |
| KR | 10-2019-0112301 | A | 10/2019 |
| KR | 10-2019-0123237 | A | 10/2019 |
| KR | 10-2099064 | B1 | 4/2020 |
| KR | 10-2021-0031450 | A | 3/2021 |

* cited by examiner

Dist : 300.557 um

GLASS HAVING VISUAL INTERNAL ROUGHNESS AND METHOD FOR MANUFACTURING SAME

CROSS-REFERENCE TO RELATED APPLICATIONS

This application is a continuation of copending International Application No. PCT/KR2022/018590, filed on Nov. 23, 2022, which is incorporated herein by reference in its entirety, and additionally claims priorities from Korean Application No. 10-2021-0168855, filed on Nov. 30, 2021 and Korean Application No. 10-2022-0149499, filed on Nov. 10, 2022, which are also incorporated herein by reference in their entirety.

TECHNICAL FIELD

The present invention relates to a chemically ion-tempered glass and a method for manufacturing same, and more particularly, to a glass having visible internal roughness and a method for manufacturing same.

BACKGROUND ART

Commercialized methods for tempering the surface of glass by applying compressive stress are largely divided into physical tempering and chemical tempering. The chemical tempering method is a method of applying the compressive stress to the surface by replacing sodium or lithium ions present inside the glass with other larger alkali ions, such as potassium ions and may be applied to thinner glass than the physical tempering method. Recently, sources of demand have been diverse, and thus the chemical tempering method has been applied from relatively limited application fields such as cover glass of conventional mobile electronic devices to more expanded fields such as automobile window glass, etc. In the future, it is determined that application fields will continue to expand, such that chemical tempering is applied to thin glass to be applied to flexible displays such as a foldable form and the like.

Recently, with the expansion of application fields, various functions, such as glass with improved antiglare performance, are needed. However, according to conventional inventions, in order to intentionally scatter light passing through glass, various methods (etching, coating, sand blasting, roller pressing, etc.) are applied to intentionally prevent the surface of the glass from being flat, and such (patterned) glass generates diffuse reflection to increase its engineering practicality. For example, in the case of a solar cell cover glass, a regularly or irregularly uneven structure is introduced to the glass surface to provide antiglare properties and simultaneously increase the transmittance and concentration of sunlight. However, since the surface of the glass according to a conventional invention is uneven, there is a problem that the effect of physical tempering and chemical tempering is lowered.

DISCLOSURE

Technical Problem

An object of the present invention is to provide a glass with chemical tempering and changes in optical properties without a change in shape of an external surface, and a method for manufacturing the same.

Technical Solution

According to an embodiment of the present invention, there is provided a method for manufacturing a chemically tempered glass including: preparing a slurry or paste containing a salt of a second ion including the second ion to be ion-exchanged with a first ion inside a glass; applying the slurry or paste onto the surface of the glass to form a coating film; drying the coating film formed of the slurry or paste on the surface of the glass; differently forming a distribution of a precipitated phase of the salt of the second ion on the surface of the glass; and heat-treating the glass on which the coating film is formed to form visual internal roughness which is provided between a first surface and a second surface facing each other on the glass to induce diffuse reflection and/or scattering of light traveling through the first surface or the second surface.

In an embodiment of the present invention, the distribution of the precipitated phase of the salt of the second ion may be adjusted by at least one of a composition of the slurry or paste (e.g., the content of the salt of the second ion in the slurry or paste), a thickness of the coating film, a drying temperature of the coating film, a drying humidity of the coating film, an ion exchange heat treatment time of the coating film, and an ion exchange heat treatment temperature of the coating film.

In an embodiment of the present invention, the visual internal roughness may correspond to a boundary between a diffusion region where the second ion is diffused and a non-diffusion region where the second ion is not diffused.

In an embodiment of the present invention, the boundary may have an irregular uneven shape.

In an embodiment of the present invention, the depth from the first surface or the second surface of the diffusion region may have an irregular value depending on a location.

In an embodiment of the present invention, at least one of the first surface and the second surface may have a flat surface.

In an embodiment of the present invention, the visible internal roughness may have a texture that is not parallel to the flat surface.

In an embodiment of the present invention, a refractive index of the glass may have different values at two different points where the visual internal roughness is different.

In an embodiment of the present invention, the refractive index of the glass may have irregular values at a plurality of points where the visual internal roughness is different.

In an embodiment of the present invention, the salt of the second ion may be $KNO_3$.

In an embodiment of the present invention, the slurry or paste may further include at least one of metal oxide particles and a viscosity modifier.

According to another embodiment of the present invention, there is provided a chemically tempered glass manufactured by the method, in which the chemically tempered glass has visual internal roughness that is provided between a first surface and a second surface facing each other to induce diffuse reflection and/or scattering of light traveling through the first surface or the second surface.

In an embodiment of the present invention, the chemically tempered glass may have a difference in component of the second ion included inside the glass according to a location between the first surface and the second surface.

In an embodiment of the present invention, a concentration difference in the second ion at different locations on the first surface and/or the second surface may be 0.1 at % or more.

US 12,668,532 B2

3

Advantageous Effects

According to an embodiment of the present invention, there is provided a glass with chemical tempering and changes in optical properties without a change in shape of an external surface and a method for manufacturing the same. An embodiment of the present invention provides a glass in which a diffusion front of exchange ions is generated in non-parallel to the curvature of the glass surface without a significant change in glass surface roughness particularly through non-dipping ion exchange.

DESCRIPTION OF DRAWINGS

FIGS. 15A to 15C are cross-sectional EDS mapping analysis results magnified by 250 times after forming a chemically tempered glass according to an embodiment of the present invention to have large visual internal roughness, medium visual internal roughness, and small visual internal roughness, respectively. FIG. 15D is a 250 times EDS mapping analysis result of a cross-section of a chemically tempered glass according to a conventional invention when tempering the one side.

Figure 16A:
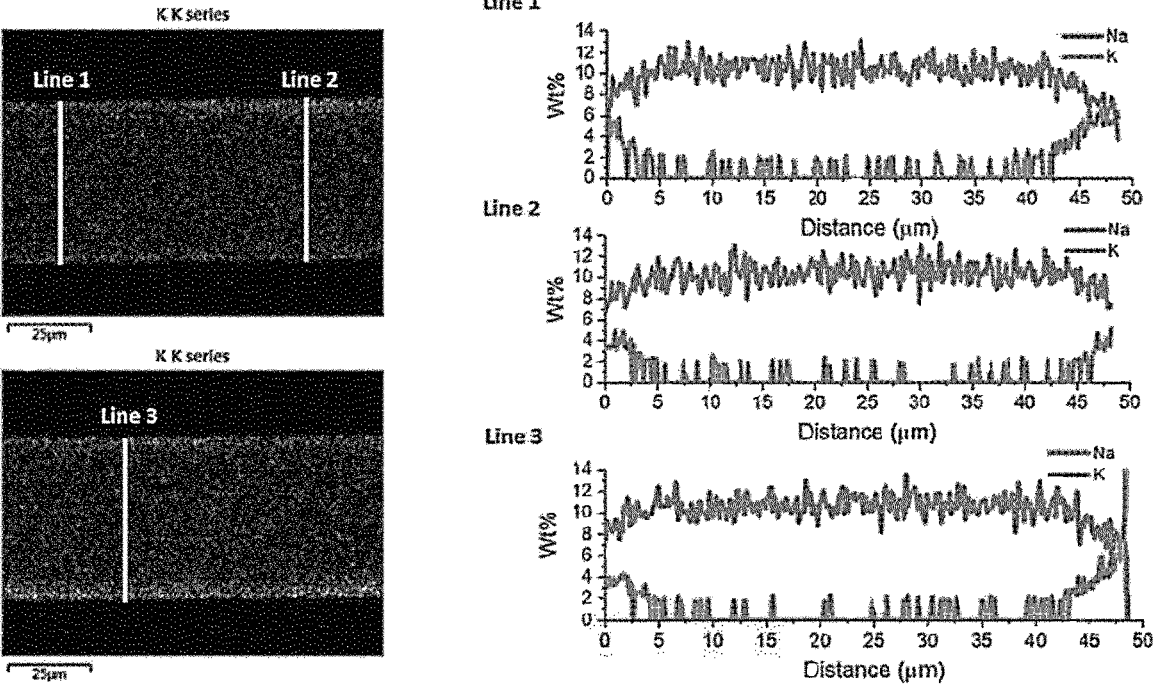
Figure 16B:
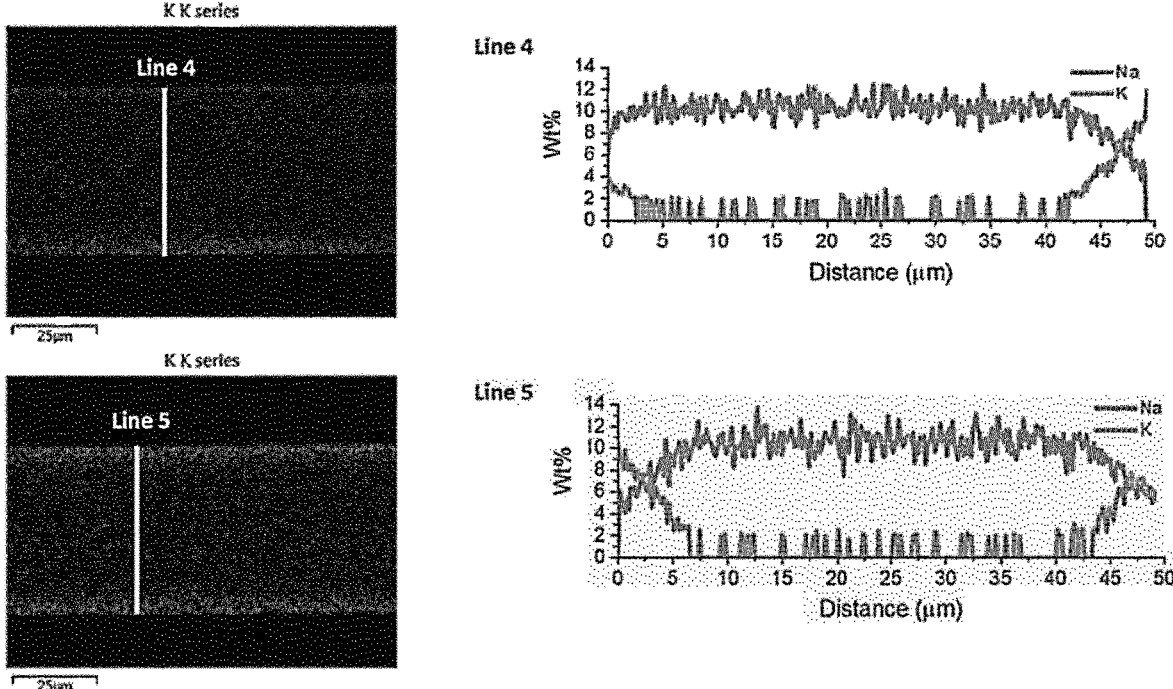
Figure 16C:
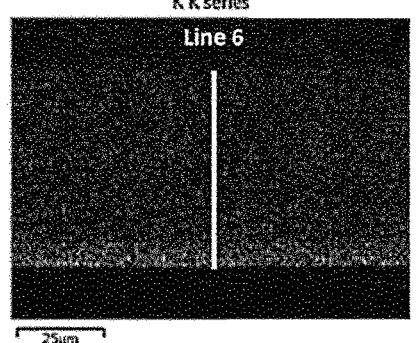
Figure 16C:
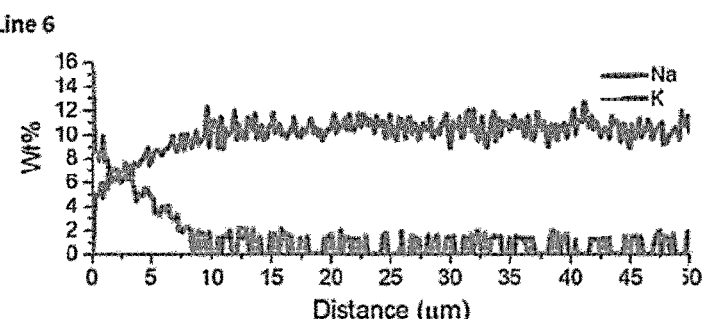

FIGS. 16A and 16B are graphs showing a cross-sectional EDS mapping analysis result and a K content analysis result according to a depth after forming a chemically tempered glass according to an embodiment of the present invention to have large visual internal roughness and medium visual internal roughness, respectively. FIG. 16C is a graph showing a cross-sectional EDS mapping analysis result and a K content analysis result according to a depth for a cross section of a chemically tempered glass that has been tempered on only one side, but has no significant visual internal roughness.

Figure 17:
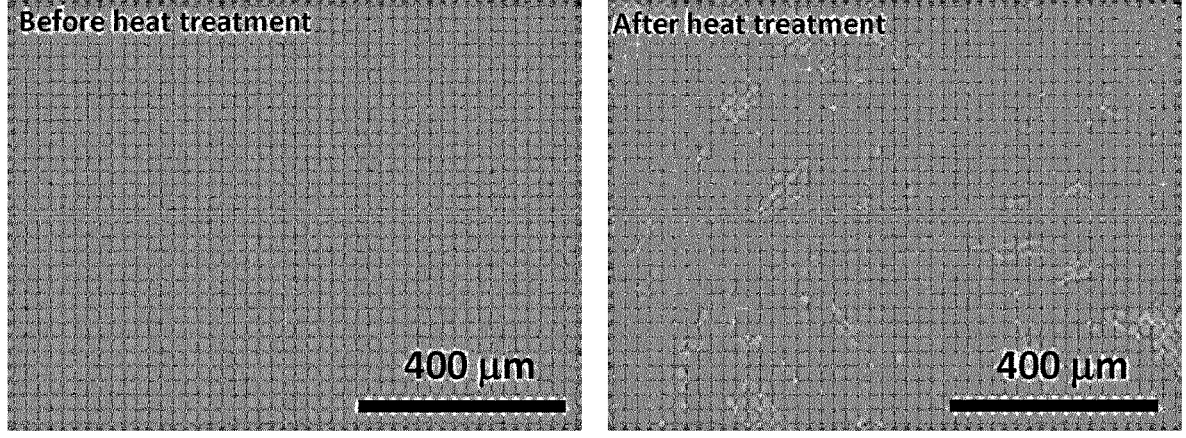

FIG. 17 is an image photographing a contact surface of a coating film of a glass attached with the coating film containing a salt of an ion to be exchanged when manufacturing a chemically tempered glass according to a conventional invention.

Figure 18:
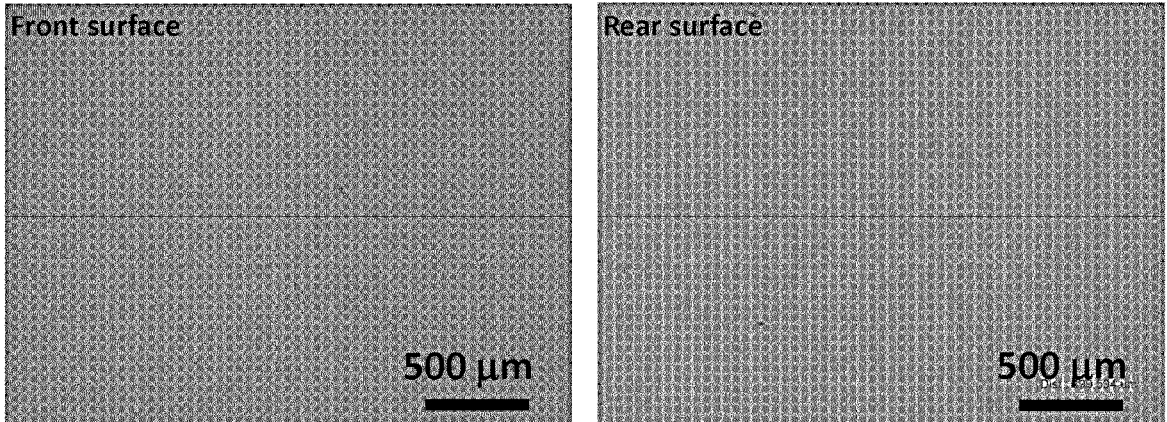

FIG. 18 is an image photographing through a polarizing microscope a glass in which ion exchange is performed through a coating film containing a salt of an ion to be exchanged when manufacturing a chemically tempered glass according to a conventional invention and then the coating film is removed.

Figure 19:
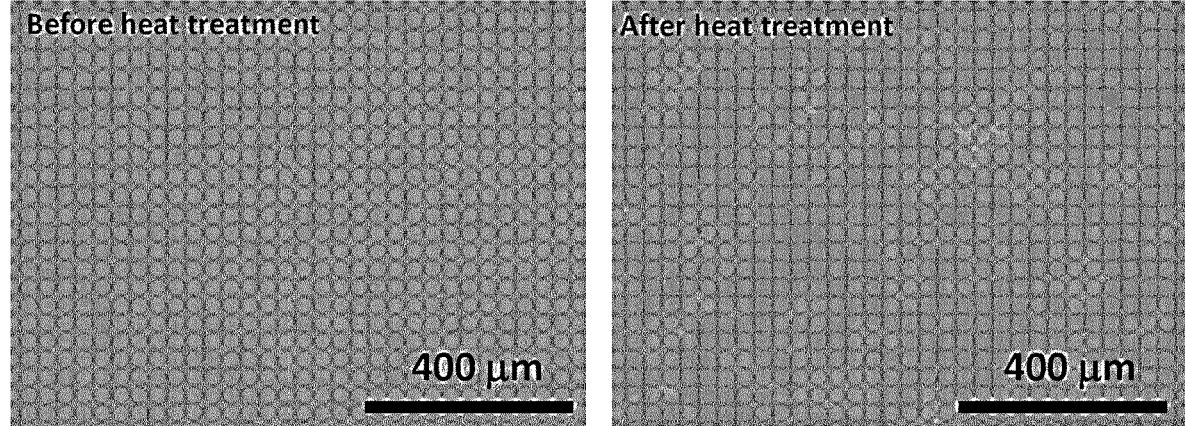

FIG. 19 is an image photographing a contact surface of a coating film of a glass attached with the coating film containing a salt of an ion to be exchanged when manufacturing a chemically tempered glass according to an embodiment of the present invention.

Figure 20:
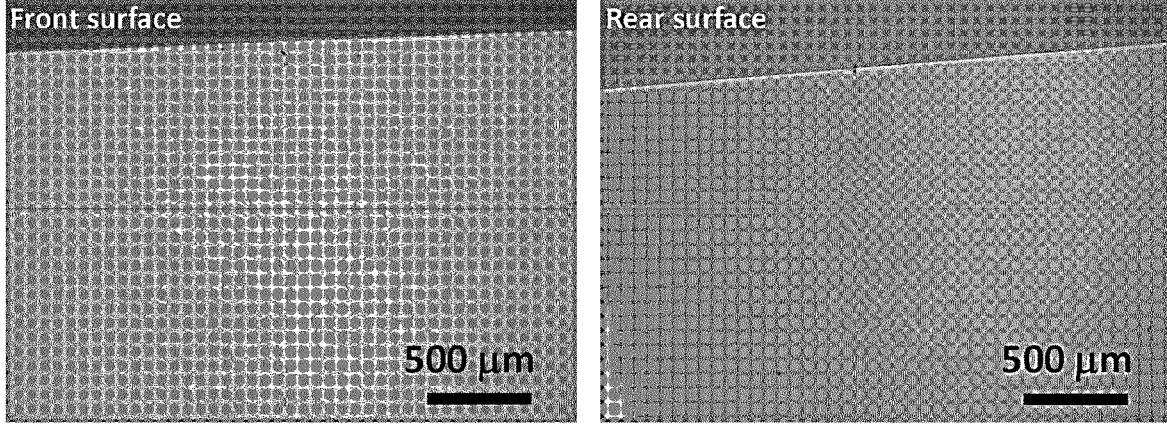

FIG. 20 is an image photographing through a polarizing microscope a glass in which ion exchange is performed through a coating film containing a salt of an ion to be exchanged when manufacturing a chemically tempered glass according to an embodiment of the present invention and then the coating film is removed.

Figure 21:
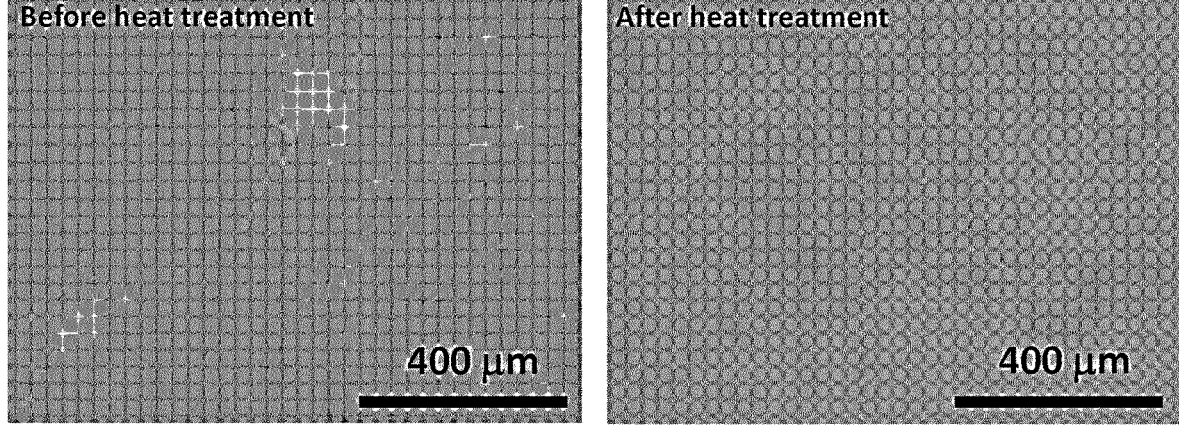

FIG. 21 is a photograph of a contact surface of a coating film of a glass attached with a coating film containing a salt of an ion to be exchanged when manufacturing a chemically tempered glass according to an embodiment of the present invention before and after heat treatment, and an image of a contact surface of a glass with a coating film in the case of forming large visual internal roughness.

Figure 22A:
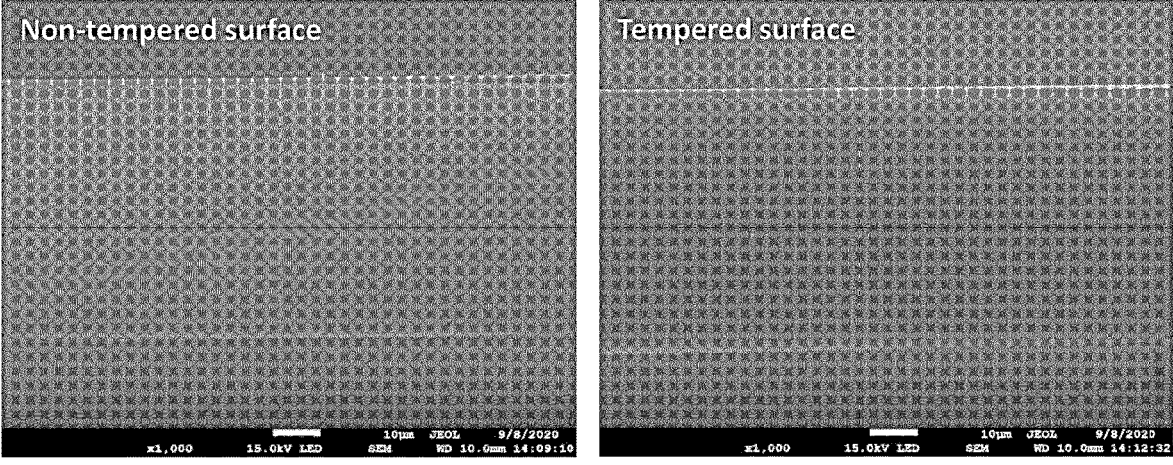
Figure 22B:
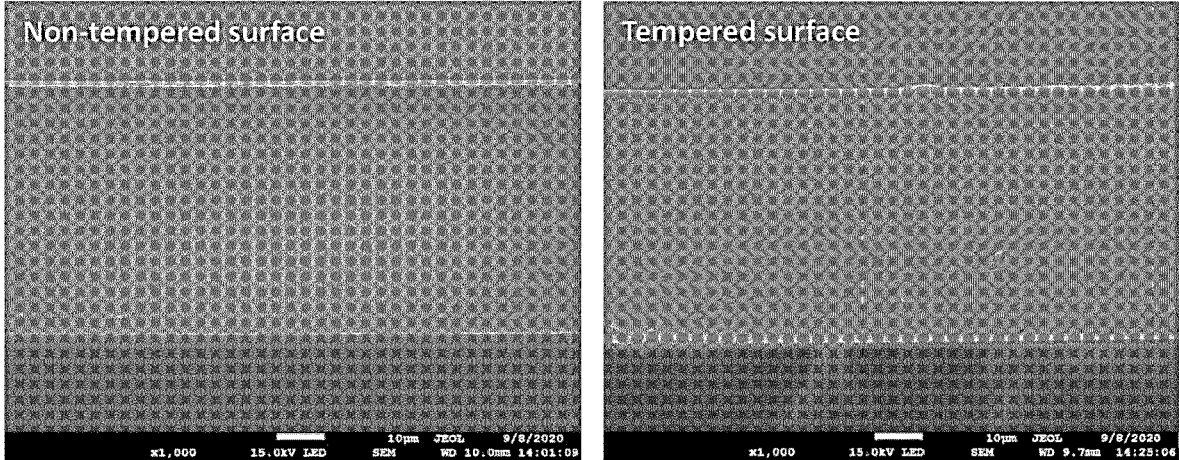

FIGS. 22A and 22B are images photographing cross sections of a non-tempered region and a chemically tempered region through SEM by setting a chemically tempered region and a non-tempered region in a glass, and generating small visual internal roughness and medium visual internal roughness only in a tempered region through chemical tempering according to an embodiment of the present invention.

Figure 23:
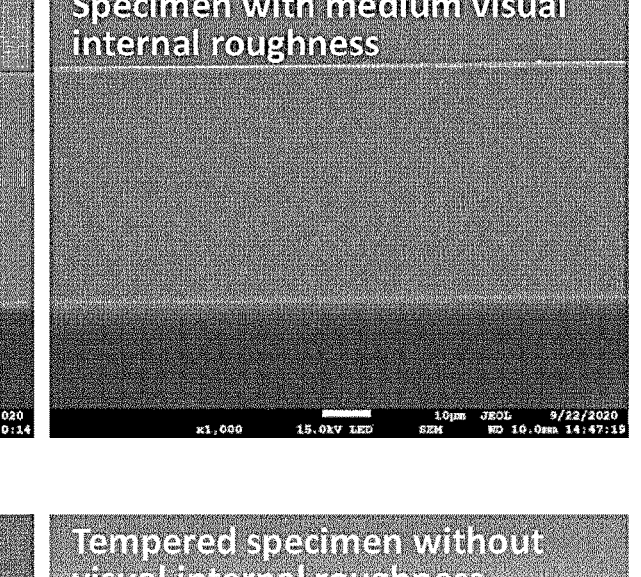
Figure 23:
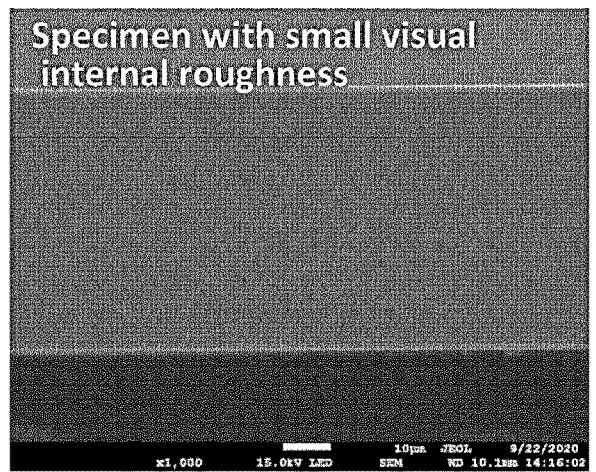
Figure 23:
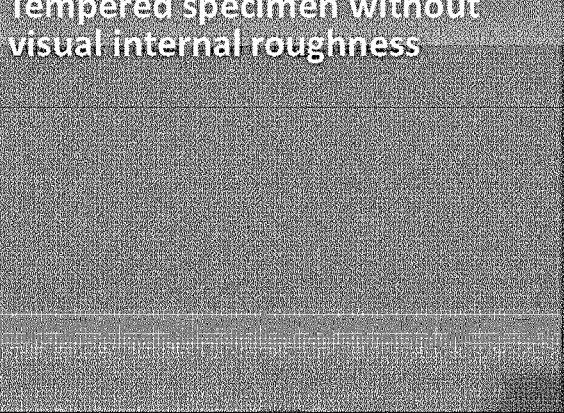

FIG. 23 is a diagram showing external surface roughness at once when chemical tempering is performed according to a conventional invention and an embodiment of the present invention.

Figure 24:
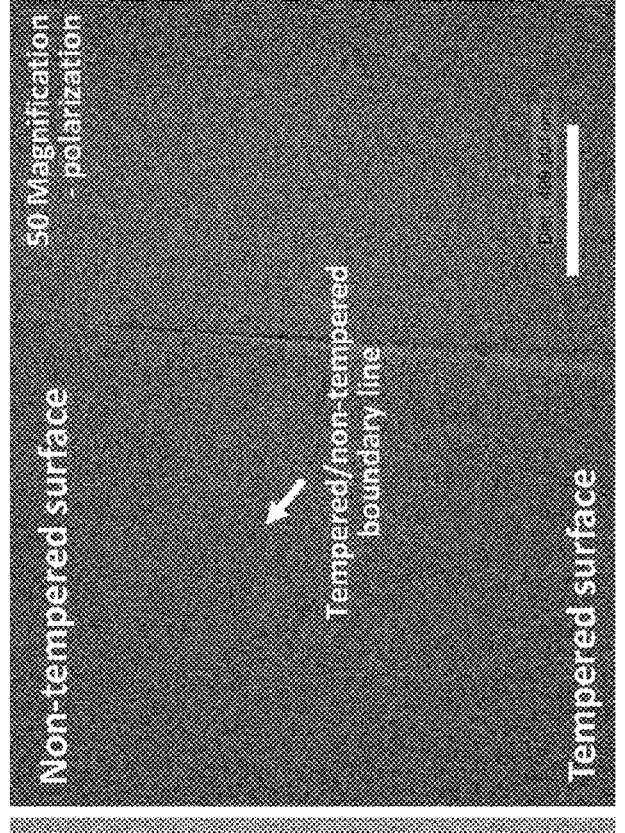
Figure 24:
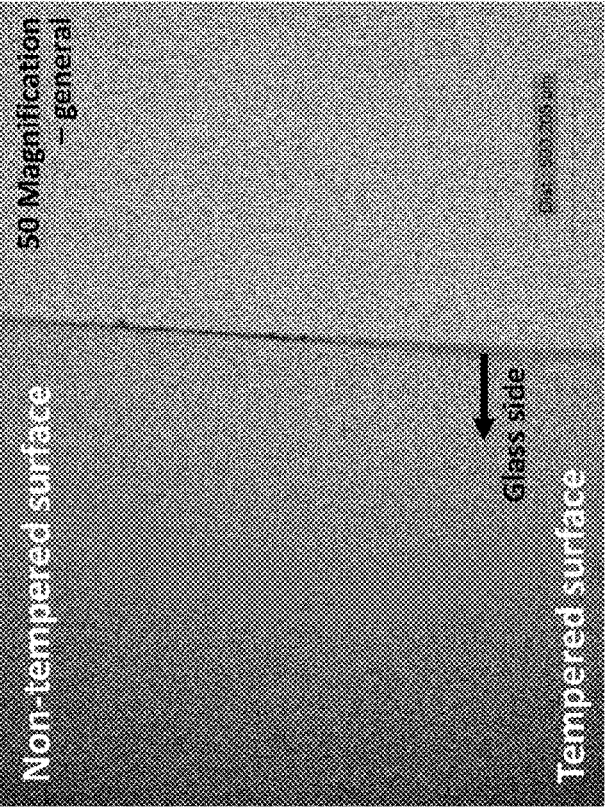

FIG. 24 is general microscope and polarizing microscope images of a boundary between a tempered surface and a non-tempered surface when chemical tempering was performed according to a conventional invention.

Figure 25:
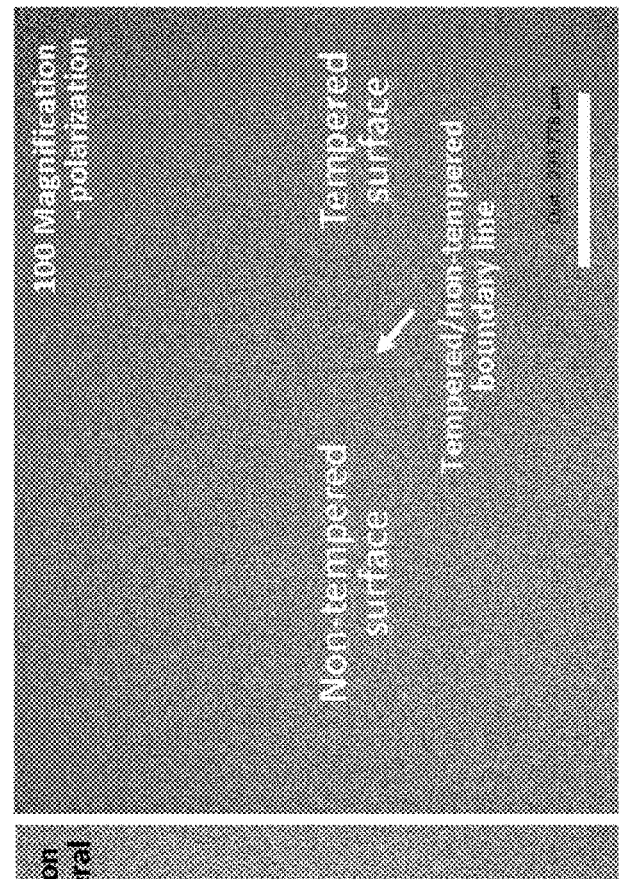
Figure 25:
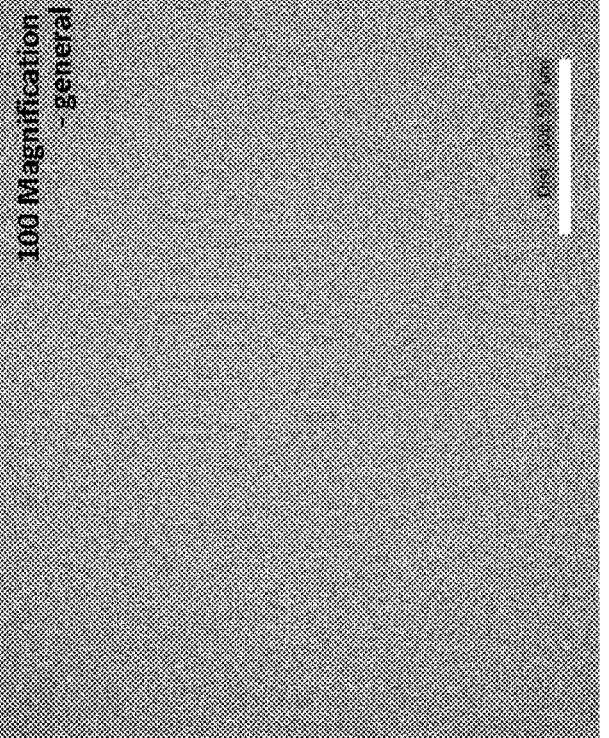

FIG. 25 is general microscope and polarizing microscope images photographing a boundary between a tempered surface and a non-tempered surface of a glass with small visual internal roughness after ion exchange according to an embodiment of the present invention.

MODES OF THE INVENTION

The present invention may apply various modifications and may have various forms, and specific embodiments will be illustrated in the drawings and will be described in detail in the specification. However, it should be understood that the present invention is not limited to specific embodiments, and the present invention covers all the modifications, equivalents and replacements included within the idea and technical scope of the present invention.

The present invention relates to a chemically tempered glass and a method for preparing the same. The glass is manufactured through a chemical ion exchange process. The chemical ion exchange process is a process in which alkali ions inside the glass interdiffuse with external ions to be ion exchanged, and the physical properties of the glass are changed through ion exchange. The ion exchange process is performed using a salt of a second ion containing a counter ion, which will be described below.

The present invention relates to a glass of which roughness properties are internally controlled so that light scattering or refraction occurs as if the glass surface had roughness while maintaining an externally exposed glass surface without a change in roughness after undergoing a chemical ion exchange process. According to an embodiment of the present invention, light passing through the inside of the glass has a textured structure that induces diffuse reflection and/or scattering inside a glass of light, regardless of the flatness of the glass surface, and the textured structure is referred to as "visual internal roughness."

Hereinafter, preferred embodiments of the present invention will be described in more detail with reference to the accompanying drawings.

Figure 1:
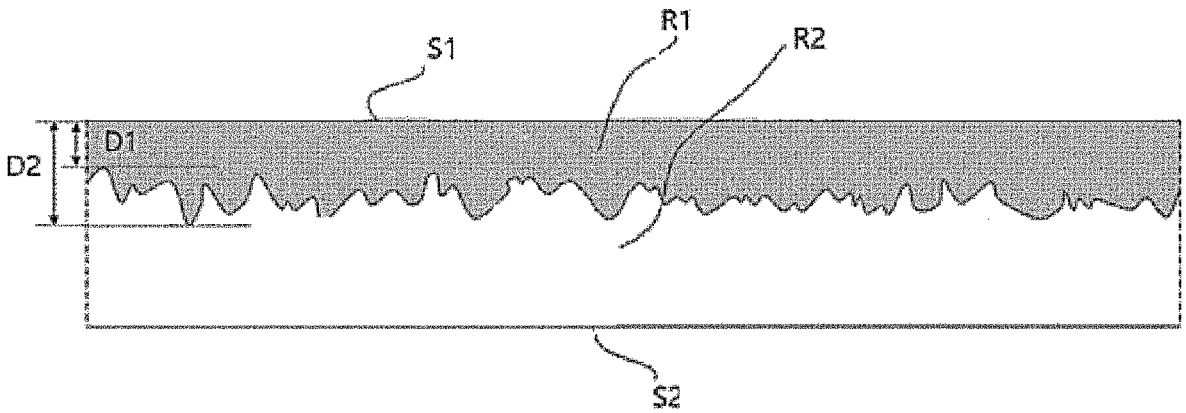
FIG. 1 is a diagram schematically illustrating a chemically tempered glass according to an embodiment of the present invention.

FIG. 1 is a diagram schematically illustrating a chemically tempered glass according to an embodiment of the present invention.

Referring to FIG. 1, a chemically tempered glass according to an embodiment of the present invention is provided in a plate shape with two surfaces facing each other, that is, a first surface S1 and a second surface S2.

At least one of the first surface S1 and the second surface S2 is a surface that has been chemically tempered through exchange of a second ion to be ion-exchanged with the first ion inside the glass. In the embodiment, for convenience of description, it is described as an example that one surface, for example, the first surface S1, rather than both surfaces of the glass, is tempered.

In another embodiment of the present invention, both surfaces of the glass, that is, the first surface S1 and the second surface S2, may be tempered.

In an embodiment of the present invention, both the first surface S1 and the second surface S2 of the glass may have a flat shape, and in an embodiment of the present invention, visual internal roughness is formed inside the glass between the first surface S1 and the second surfaces S2.

The visual internal roughness corresponds to a boundary formed according to the degree of diffusion of the second ion provided during ion exchange.

When a region where the second ion is diffused/exchanged is called a diffusion region R1, and a region where the second ion is not diffused/exchanged and there is the first ion of a pristine glass is called a non-diffusion region R2, the visual internal roughness corresponds to a boundary between the diffusion region R1 where the second ion is diffused and the non-diffusion region R2 where the second ion is not diffused.

In an embodiment of the present invention, the boundary has an irregular shape and has a texture that is not parallel to the first surface S1 or the second surface S2, that is, unevenness. Accordingly, the depth from the first surface S1 or the second surface S2 of the diffusion region R1 may have different values depending on a location and may have irregular values depending on a location. For example, in the boundary, if one of points close to the first surface S1 is called a first depth D1 and one of points close to the second surface S2 is called a second depth D2, the first depth D1 and the second depth D2 may have different values, and the difference between the values may vary depending on a location.

The diffusion region R1 and the non-diffusion region R2 may be formed by a difference in components between an alkali ion inside the glass on the first surface S1 or the second surface S2 and a salt of a second ion including the second ion to be ion-exchanged with the alkali ion. For example, the diffusion region R1 and the non-diffusion region R2 have a difference in concentration between the first ion and the second ion inside the glass. For example, in the diffusion region R1, ion exchange occurs so that the concentration of the second ion may be high, and in the non-diffusion region R2, ion exchange does not occur, so that the concentration of the first ion may be high. Due to the difference in concentration between the first ion and the second ion, light passing through the diffusion region R1 and the non-diffusion region R2 feels different refractive indexes. The refractive index may have irregular values at a plurality of points where the visual internal roughness is different. Through this, in the chemically tempered glass according to an embodiment of the present invention, the light traveling through the first surface S1 or the second surface S2 is diffuse-reflected, scattered, or diffuse-reflected and scattered simultaneously by the visual internal roughness.

Accordingly, since the length of the diffusion region R1 and the non-diffusion region R2 vary depending on a location through which light passes, an effective refractive index of the diffusion region R1 varies depending on a location, and a refractive index distribution in a portion having visual internal roughness is not constant to cause scattering of light.

In an embodiment of the present invention, the first ion may be a Na ion, and the second ion may be a K ion. The salt of the second ion may be $KNO_3$.

The visual internal roughness of the chemically tempered glass having the above-described structure may be formed by intentionally controlling an exchanged region distribution and a concentration distribution of a salt during chemical ion exchange. In particular, the chemically tempered glass may be manufactured by controlling the diffusion of the second ion to be ion-exchanged with the first ion inside the glass. The glass having visual internal roughness may be formed by controlling a process condition so that the salt to be exchanged during ion exchange is diffused to different degrees depending on a location in the ion exchange step.

To this end, in an embodiment of the present invention, the visual internal roughness is formed by preparing a slurry or paste containing a salt of a second ion containing the second ion to be ion-exchanged with the first ion inside the glass, applying the slurry or paste on the surface of the glass to form a film, drying the film formed of the slurry or paste on the surface of the glass, and then heat-treating the glass on which the film is formed.

Here, a process of forming a different distribution of the precipitated phase of the salt of the second ion on the surface of the glass is included. The visual internal roughness is formed differently depending on the distribution of the precipitated phase of the salt of the second ion. In the distribution of the precipitated phase of the salt of the second ion, at least one of a composition of the slurry or paste (e.g., the content of the salt of the second ion in the slurry or paste), a thickness of the film formed of the slurry or paste, a drying temperature of the film formed of the slurry or paste, a drying humidity of the film formed of the slurry or paste, an ion exchange heat treatment time of the film formed of the slurry or paste, and an ion exchange heat treatment temperature of the film formed of the slurry or paste may be adjusted, and thus the diffusion of the second ion is controlled.

In an embodiment of the invention, a process of forming the visible internal roughness does not substantially affect the appearance of the glass itself. That is, in the chemically tempered glass, both the first surface S1 and the second surface S2 are not substantially changed in shape before and after the chemical tempering process.

In an embodiment of the present invention, the first surface S1 and the second surface S2 may be provided as flat as in the above-described embodiment, and the flat shape may be provided before or after the process of forming the visual internal roughness. In contrast, in another embodiment of the present invention, when the glass is provided in a shape in which the first surface S1 and the second surface S2 of the glass are not flat, the non-flat shape in the original state may be maintained even both before and after forming the visual internal roughness. This will be described in more detail as follows.

The visual internal roughness actually exhibits the same optical effect as when the roughness is formed on the outer surface, but does not form the corresponding roughness at the interface between two materials, for example, glass and air, and has only a visual difference inside the glass. In other words, when chemically tempering the surface of the glass through non-dipping ion exchange, a concentration distribution in the glass of diffuse species (e.g., ions to be ion exchanged) in which interdiffusion occurs and a resulting spatial distribution are formed differently without any visible change in the roughness of the surface of the tempered glass to impart visual internal roughness characteristics. The spatial distribution of the diffuse species may impart visual internal roughness properties by a method of forming an effective diffusion depth differently depending on a location. The spatial distribution of these diffuse species may be represented by the concentration of the diffuse species (e.g., the concentration of alkali ions) on the surface of the glass. That is, the spatial distribution of the diffuse species may vary depending on an effective diffusion depth, but the effective diffusion depth is substantially directly affected by the concentration of the diffuse species on the surface. Accordingly, in an embodiment of the present invention, visual internal roughness is controlled by controlling the concentration and distribution of an alkali salt on the glass surface.

Specifically, in order to implement the characteristics, when preparing a slurry containing an alkali salt such as $KNO_3$, a solvent of the corresponding alkali salt including water, a metal oxide, etc., a content ratio of the alkali salt and the metal oxide, a relative ratio of the metal oxide and the solvent, and the like are adjusted to control the size and distribution of a precipitated phase such as $KNO_3$, etc. formed on the glass surface after forming the coating film, and control the ion exchange process conditions. Depending on the size and distribution of the precipitated phase such as $KNO_3$, etc., a maximum difference in composition between alkali salts (for example, potassium and sodium) on the glass surface occurs.

By controlling these ion exchange process conditions, the visual internal roughness may be formed in various ways, and for example, large visual internal roughness, medium visual internal roughness, and small visual internal roughness may be formed depending on the degree of roughness. The large visual internal roughness, the medium visual internal roughness, and the small visual internal roughness may be defined as follows. Here, the size of each visual internal roughness may be confirmed with the naked eye, and more accurately, the size may be confirmed with a polarizing microscope, and the average is based on 20 measurements.

1) Small visual internal roughness: When a straight line of 500 μm long is randomly drawn on the surface, a difference in the corresponding components occurs at 1 at % or less on average and occurs with frequency of 10 times or more on average.

2) Medium visual internal roughness: When a straight line of 500 μm long is randomly drawn on the surface, a difference in the corresponding components occurs more than 1 at % and more than 2 at % on average and occurs with frequency of 5 times or more on average.

3) Large visual internal roughness: When a straight line of 500 μm long is randomly drawn on the surface, a difference in the corresponding components occurs 2 at % or more on average and occurs with frequency of less than 5 times on average.

When observing the glass according to an embodiment of the present invention with a polarizing microscope, the contrast of the change in refractive index shown in the image tends to weaken as the range unit showing a similar tendency becomes smaller. The difference in visual internal roughness may be adjusted by controlling a mixing ratio of the alkali salt and metal oxide particles, a size and a shape of the metal oxide particles, coating film formation and drying conditions, ion exchange heat treatment conditions, etc.

According to an embodiment of the present invention, in order to form visual internal roughness, a slurry and/or paste containing an alkali salt such as a salt of a second ion (a salt of an alkali ion, e.g., $KNO_3$), which is exchanged with a first ion (alkali ion, e.g. Na ion) inside the glass is prepared and applied to a glass surface to form a coating film.

When preparing the slurry or paste containing the salt of the second ion (hereinafter referred to as an alkali salt) and forming the coating film on the glass surface, the coating film may be formed using a general spray-based coating method or a paste-based coating method, respectively.

For example, there may be provided a composition and a process in which an alkali salt existing in a molten or semi-molten state under heat treatment conditions for ion exchange after forming a film on the glass surface is uniformly distributed in contact with the surface of the glass and further assists in ion exchange. In addition, according to the present invention, there may be provided a composition and a process of preparing a slurry or paste containing no or a relatively small amount of an alkali salt, forming a film on the glass surface using a general spray-based coating method or a paste-based coating method, respectively, and then adding an alkali salt by applying an alkali salt (aqueous) solution by a spray method or immersing in alkali salt (aqueous) solution, distributing the alkali salt existing in a molten or semi-molten state under heat treatment conditions for ion exchange uniformly in contact with the surface of the glass, and further assisting in ion exchange. The slurry and/or paste may further include metal oxide particles in addition to the alkali salt. Thereafter, the content of the alkali salt and the metal oxide particles may be a factor that controls the distribution of a precipitated phase of the alkali salt. In addition, a film formed with the metal oxide particles and the salt in a slurry state by a general spray-based process may be dried for a predetermined period of time under a predetermined relative humidity. Here, the humidity condition, drying time, and drying temperature during drying may also be other factors that control the distribution of the precipitated phase of the alkali salt.

In an embodiment of the present invention, when drying the coating film applied in the slurry/paste state, the coating film may be dried at 0° C. to 200° C. for 5 seconds to 12 hours. At this time, the humidity condition may be 10% to 90% relative humidity. Here, for reference, the step of drying the coating film is for precipitation of an ionic salt of ions contained in the coating film, in addition to achieving drying of the coating film by volatilizing the solvent (mainly water). The degree of precipitation of the ionic salt may be controlled by controlling the coating film thickness, drying temperature, drying time, and humidity conditions during drying. At this step, the salt (for example, $KNO_3$) may be precipitated into solid particles as the solvent volatilizes away, and the size and distribution of solid particles may vary depending on drying conditions.

In an embodiment of the present invention, at least one of the composition of the slurry or paste (e.g., the content of the salt of the second ion in the slurry or paste), the thickness of the coating film of the slurry or paste, the drying temperature of the slurry or paste, the drying humidity of the slurry or paste, the drying time of the slurry or paste, the heat treatment temperature, and the heat treatment time may be adjusted to control diffusion of the second ion. For example, when forming the coating film by varying the composition of the slurry or paste, the shape of the precipitated phase may vary depending on the composition, and visual internal roughness may also occur to different degrees depending on the shape of the precipitated phase.

In an embodiment of the present invention, the metal oxide particles that may be mixed with the alkali salt may have at least one composition of $TiO_2$, $ZnO$, $ZrO_2$, $CuO$, and $NiO$. For example, the metal oxide particles mainly have the composition of $TiO_2$, $ZnO$, $ZrO_2$, $CuO$, or $NiO$, and the $TiO_2$, $ZnO$, $ZrO_2$, $CuO$, or $NiO$ particles may be mixed with a salt aqueous solution alone or in common to form a slurry/paste state.

Alternatively, the metal oxide particles may include a plurality of particles having at least one composition of $Cr_2O_3$, $MnO_2$, $MnO$, $Fe_2O_3$, $FeO$, $Co_2O_3$, $Y_2O_3$, $TeO_2$, $CeO_2$, $La_2O_3$, $Nd_2O_3$, $Pr_2O_3$, $Sm_2O_3$, $Eu_2O_3$, $Gd_2O_3$, $Tb_2O_3$, $Dy_2O_3$, $Ho_2O_3$ and $Er_2OO_3$. For example, the metal oxide particles mainly have a composition of $Cr_2O_3$, $MnO_2$, $MnO$, $Fe_2O_3$, $FeO$, $Co_2O_3$, $Y_2O_3$, $TeO_2$, $CeO_2$, $La_2O_3$, $Nd_2O_3$, $Pr_2O_3$, $Sm_2O_3$, $Eu_2O_3$, $Gd_2O_3$, $Tb_2O_3$, $Dy_2O_3$, $Ho_2O_3$ or $Er_2O_3$, and $Cr_2O_3$, $MnO_2$, $MnO$, $Fe_2O_3$, $FeO$, $Co_2O_3$, $Y_2O_3$, $TeO_2$, $CeO_2$, $La_2O_3$, $Nd_2O_3$, $Pr_2O_3$, $Sm_2O_3$, $Eu_2O_3$, $Gd_2O_3$, $Tb_2O_3$, $Dy_2O_3$, $Ho_2O_3$ or $Er_2O_3$ particles may be mixed with a salt aqueous solution alone or in common to form a slurry/paste state.

The glass on which the coating film is formed may be heat-treated in a predetermined temperature range (for example, about 100 to about 600° C.). The glass on which the film is formed is heat-treated in a temperature range at which all or part of the salt of the coating film becomes liquid through heat treatment, and ion exchange may occur between the alkali ions and the alkali ions (e.g. sodium ions, etc.) inside the glass through the salt spread inside the film. In an embodiment of the present invention, the heat treatment step may be performed, for example, at about 250° C. or higher. When the film is usually heat-treated at a temperature of about 250° C. or higher, the salt (for example, $KNO_3$) is fully or partially melted to become a (quasi) liquid state, and the ion exchange occurs via the liquid phase or via the surface of the particle between alkali ions such as sodium ions inside the glass and the ion exchange second ion (e.g., alkali ions such as potassium ions, silver ions, copper ions, or gold ions, etc.) inside the film.

Through the heat treatment step, ion exchange may occur between alkali ions such as potassium and alkali ions such as sodium ions inside the glass via an alkali salt such as a liquid potassium salt spread inside the coating film. In another embodiment of the present invention, the salt solution may be a silver salt solution, a gold salt solution, or a copper salt solution. In this case, silver ions, gold ions, or copper ions inside the coating film may be ion-exchanged with alkali ions (for example, sodium ions, etc.) inside the glass as second ion exchange ions.

When silver ions are introduced into glass through ion exchange, the silver ions may exist in the form of $Ag^+$ ions or $Ag^0$ type metallic clusters or metal nanoparticles under the influence of other components contained in the glass. In other words, in order to reduce the $Ag^+$ state to be make into the $Ag^0$ state, basically, a trace amount of element such as Fe, V, Mn, Co, Ce, Eu, Cr, etc. needs to be contained inside the glass. The corresponding elements all have multi-valent characteristics, having two or more oxidation values. For example, $Ag^+$ ions are reduced to $Ag^0$ state metal particles through an oxidation-reduction reaction in the form of $Fe^{2+}+Ag^+\leftrightarrow Fe^{3+}+Ag^0$. As a result, surface plasmon resonance absorption formed by silver nanoparticles may occur, the color of the glass may change due to other ions that have undergone changes in oxidation values, and may be used as a biosensor, etc. using a surface plasmon resonance phenomenon. In addition, if the multi-valent ions do not exist inside the glass, the $Ag^+$ ions introduced into the glass remain in the state to exhibit an antibacterial effect, etc., in addition to the surface tempering effect. The silver ions may also be replaced with gold ions or copper ions. Meanwhile, in a sodium-containing glass, silver ions have a larger interdiffusion coefficient than potassium ions, so that ion exchange occurs faster, and the polarizability is large, so that the visual internal roughness effect may occur more clearly.

In an embodiment of the present invention, the metal oxide particles may be particles that satisfy the conditions for forming a paste state by mixing an aqueous salt solution (alkali salt solution such as potassium salt, silver salt solution, gold salt solution, or copper salt solution) and a viscosity control additive, so as to form a film on the surface of the glass by a paste-based coating method.

For reference, the viscosity control additive may be an industrial or edible composition commonly used in preparing general pastes. For example, industrial or edible compositions commonly used in preparing general pastes may be used as a viscosity control additive as it is.

For example, the viscosity control additive may include one or more of glycerin, terpinol, glucose, and xanthan gum. In other words, the viscosity control additive is an additive added to increase the viscosity of the mixed solution (slurry) mixed with the aqueous salt solution and the metal oxide particles to be made into a paste state, and may include one or more of glycerin, terpinol, glucose, and xanthan gum. In addition, the viscosity control additive may include one or more of alcohol, polyvinyl alcohol, polyethylene glycol, methylcellulose, polyvinyl pyrrolidone, hydroxypropyl cellulose, hydroxypropyl methylcellulose, etc.

As such, in the present invention, when preparing the slurry by mixing the salt of the second ion and the metal oxide particles and forming the coating film on the glass surface, the salt of the second ion generated on the glass surface after drying is differently formed depending on a location on the glass surface. Accordingly, visual internal roughness occurs due to different refractive indices caused by a difference in a location of a diffusion phenomenon that occurs after heat treatment for ion exchange, and additionally, compressive stress is applied to the surface to have chemical tempering characteristics.

The chemically tempered glass according to an embodiment of the present invention is manufactured using non-dipping ion exchange as described above, and the diffusion front of exchanged ions is generated in non-parallel to the curvature of the glass surface without a significant change in glass surface roughness. In a general ion exchange process, interdiffusion of each ion occurs in a direction perpendicular to the glass surface, and after ion exchange, the depth of layer occurs in parallel to the curvature of the glass surface and does not cause a significant difference depending on a location. In other words, when observing the glass surface with the naked eye after a general ion exchange process, if there are no defects such as warpage, dimples, or pits, the roughness of the glass surface before the ion exchange process is maintained. Therefore, there is no significant difference in reflectance and reflection type (specular reflection or diffuse reflection).

Actually, according to the conventional invention, a method of intentionally roughening the surface of the glass was used to intentionally scatter light passing through the glass. For example, the surface of the glass was roughened by physical/chemical etching, coating, sand blasting, roller pressing, etc. In the case of a glass manufactured by the method to have roughness on the surface, effects such as improvement in antiglare characteristics due to the roughness may be obtained by generating diffuse reflection, thereby increasing engineering practicality. For example, in the case of a solar cell cover glass, a regular or irregular uneven structure is introduced to the glass surface to provide antiglare properties and simultaneously increase the transmittance and concentration of sunlight. For example, according to a conventional invention, in the case of the surface of the solar cell cover glass, a nanostructure was formed using lithography technology to have anti-reflection properties. Here, a nanostructure with unevenness was formed on the glass surface to achieve anti-reflection properties and increased solar cell efficiency. To this end, a silica-based thin film with anti-reflection and dust-proof properties was formed on the solar cell cover glass by spraying. As a result, according to a conventional invention, it was possible to obtain effects of increasing transmittance and reducing reflectance by forming a thin film on the surface of the solar cell cover glass. However, because the surface of the glass according to a conventional invention is uneven, there is a problem that the effect of physical tempering and chemical tempering is lowered and simultaneously it is difficult to clean contaminants.

In contrast, in the present invention, since anti-reflection properties may be imparted by forming visual internal roughness through a difference in internal refractive index distribution without a change in surface roughness, an additional thin film deposition process is not required, and a different refractive index distribution for each location is provided only through the tempering process to implement anti-reflection properties.

In the present invention, for an alkali-containing glass with a surface as flat as a general float glass, a diffusion front where interdiffusion occurs while there is no visible change in surface roughness is not parallel to the surface of the glass through non-dipping ion exchange.

In particular, an embodiment of the conventional invention is characterized by a glass having scratch resistance by forming surface roughness through texturing on the glass surface and forming a compressive stress area through ion exchange. On the other hand, in the present patent, while there is no roughness on the glass surface depending on the composition of a metal oxide slurry, visual internal roughness may be formed, and a compressive stress area may be formed at the same time through a difference in the ion exchange depth layer. In addition, the conventional invention is limited to a scratch-resistant glass and relates to a glass that has an appropriate Knoop scratch threshold through texturing on the surface and may form a compressive stress area, but the present invention provides a glass having visual internal roughness in which glass surface roughness is not changed but varies for each location of the diffusion depth layer through ion exchange, and thus a refractive index is generated differently for each location.

Hereinafter, the present invention will be described through each Example.

Figure 2:
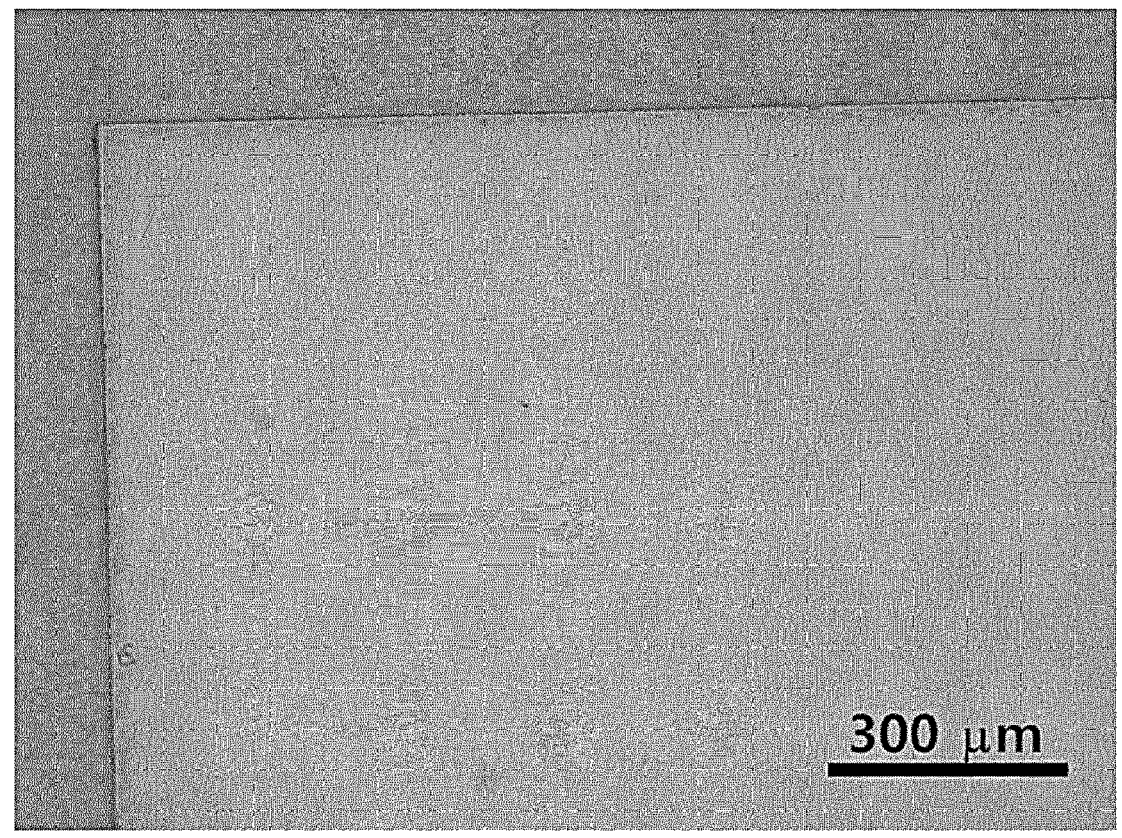
FIG. 2 is a photograph of a pristine glass in which ion exchange has not been performed using a polarizing microscope.

Example 1. Polarizing Microscopic Imaging of Visual Internal Roughness According to Conventional Invention and the Present Invention FIG. 2 is a photograph of a pristine glass in which ion exchange has not been performed using a polarizing microscope, FIG. 3 is a photograph of a glass after general ion exchange according to a conventional invention using a polarizing microscope, FIG. 4 is a photograph of a glass according to an embodiment of the present invention using a polarizing microscope, and FIG. 5 is a photograph of a glass from which internal residual stress is removed through additional heat treatment on the glass of FIG. 4 using a polarizing microscope.

Figure 3:
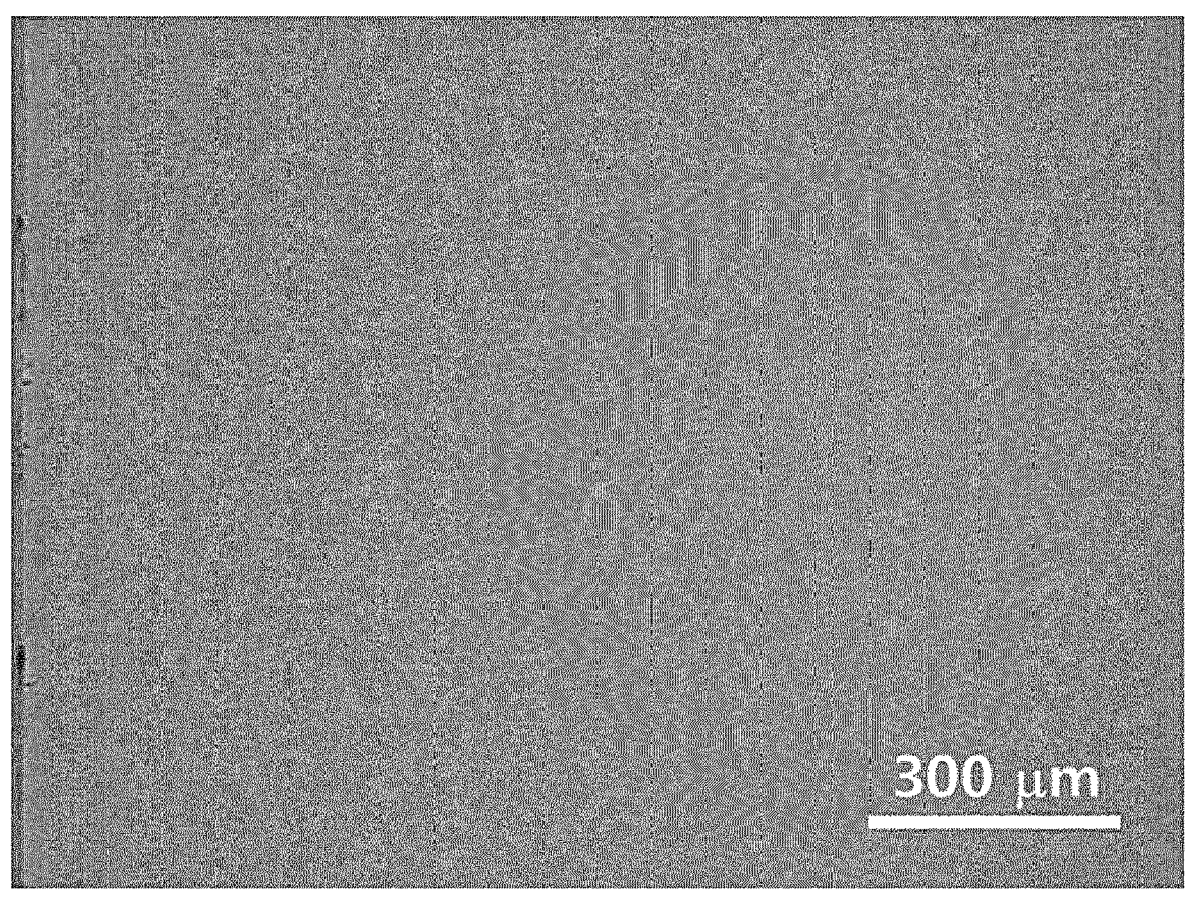
FIG. 3 is a photograph of a glass after general ion exchange according to a conventional invention using a polarizing microscope.
Figure 4:
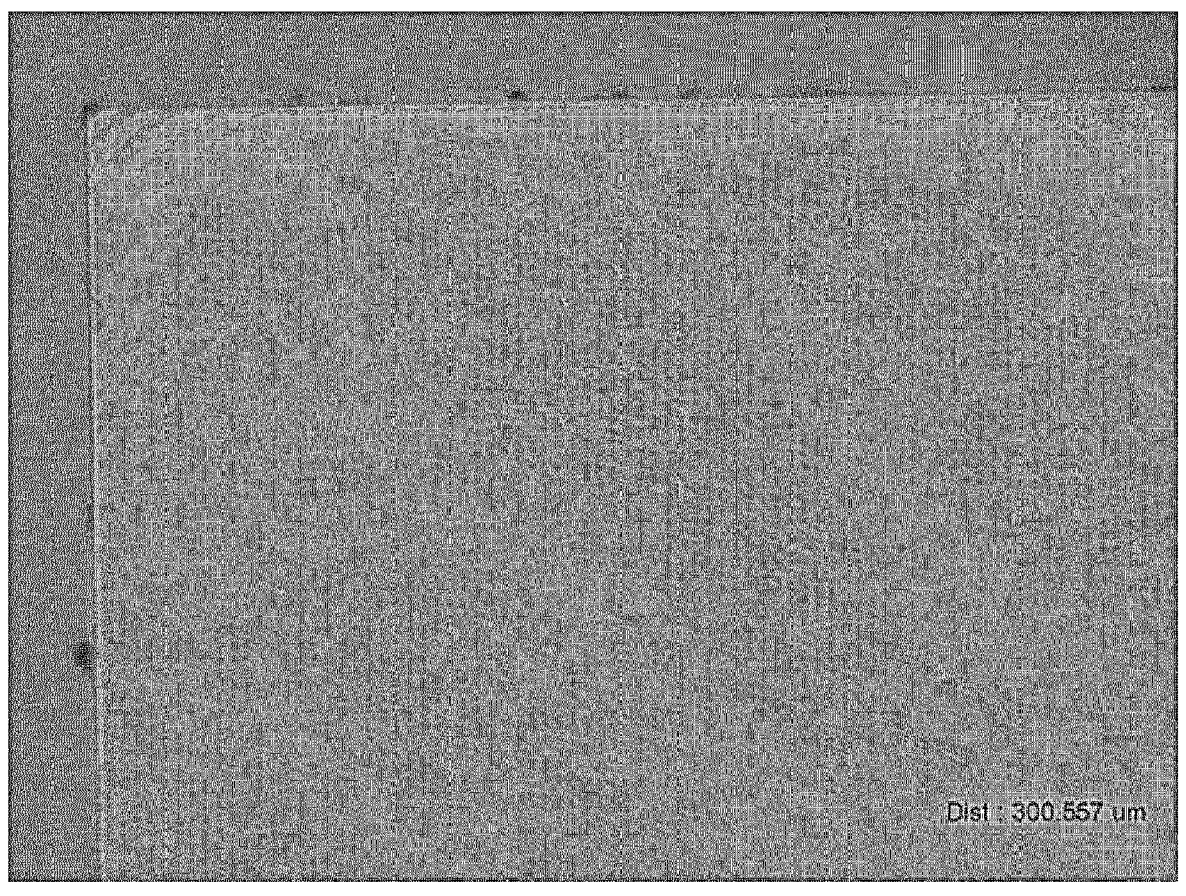
FIG. 4 is a photograph of a glass according to an embodiment of the present invention using a polarizing microscope.
Figure 5:
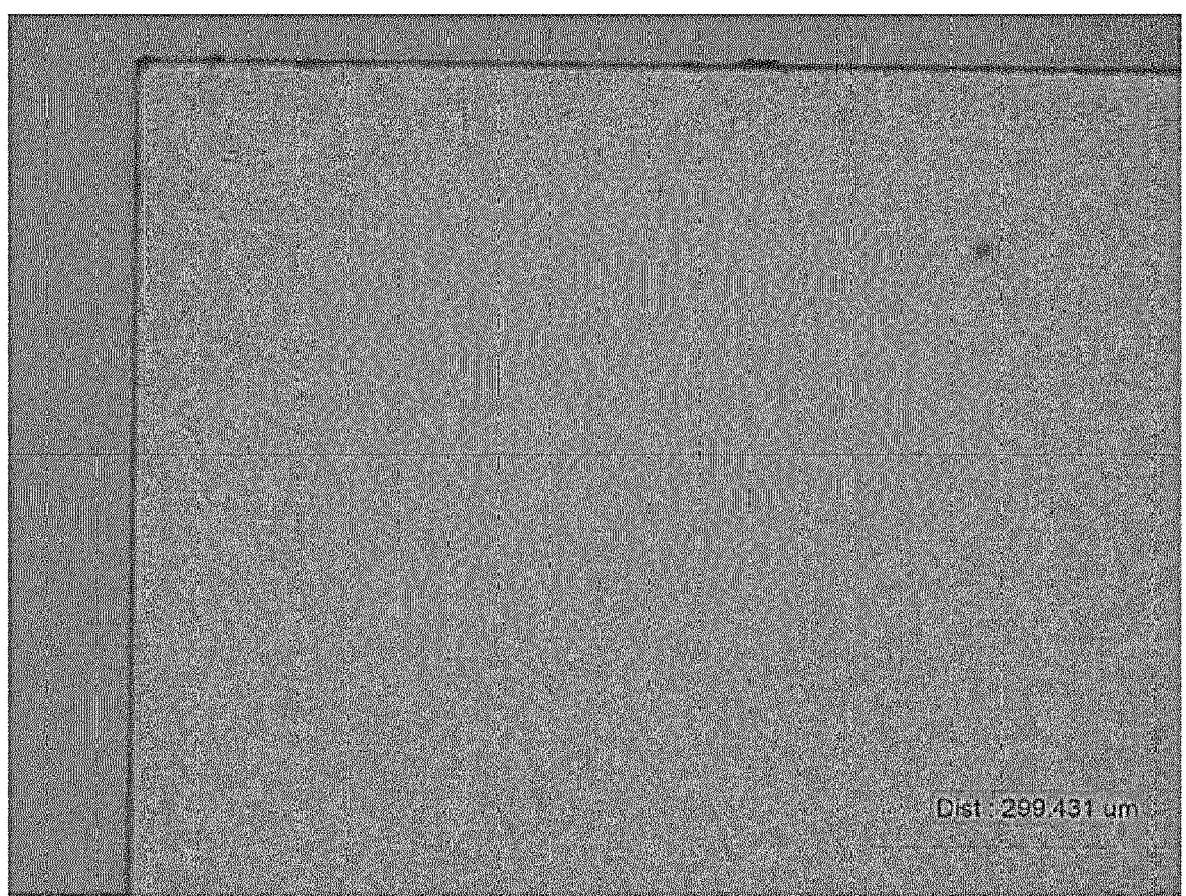
FIG. 5 is a photograph of a glass according to an embodiment of the present invention using a polarizing microscope.

FIGS. 3 to 5 show that after forming a coating film by varying the composition of a slurry containing an alkali salt, a precipitated phase was controlled differently even under the same drying condition for precipitation of the alkali salt.

In detail, FIG. 3 shows a conventional invention, which is an image photographing a glass surface using a polarizing microscope after forming a coating film using a slurry with a $TiO_2$.

$KNO_3$ mass ratio of 29:71 in 100 ml of water solvent, drying the coating film at room temperature and 80% humidity, conducting ion-exchange heat treatment at 450° C. for 8 minutes, and removing the coating film.

FIGS. 4 and 5 are images photographing a glass surface using a polarizing microscope after forming a coating film using a slurry with a $TiO_2$:$KNO_3$ mass ratio of 60:40 in 40 ml of a water solvent, drying the coating filme at room temperature and 80% humidity, conducting ion exchange heat treatment at 450° C. for 8 minutes, and removing the coating film.

FIG. 5 is the same specimen as FIG. 4, which was prepared by removing the coating film after generating visual internal roughness and performing additional heat treatment at 610° C. for 2 hours.

First, referring to FIG. 2, since ion exchange did not occur, no change in roughness was shown when observed with a polarizing microscope. In addition, in the case of FIG. 3, even after general ion exchange according to a conventional invention, the change in roughness was not shown to the same level as that of a pristine glass. However, in the case of FIG. 4, it may be clearly seen that irregular roughness (i.e., visual internal roughness) appears on the front surface of the ion exchanged region. The glass shown in FIG. 4 had large visual internal roughness. Also, referring to FIG. 5, it may be seen that the visual internal roughness that has occurred in FIG. 4 disappears as internal stress is removed from the glass shown in FIG. 4 through additional heat treatment.

Figure 6A:
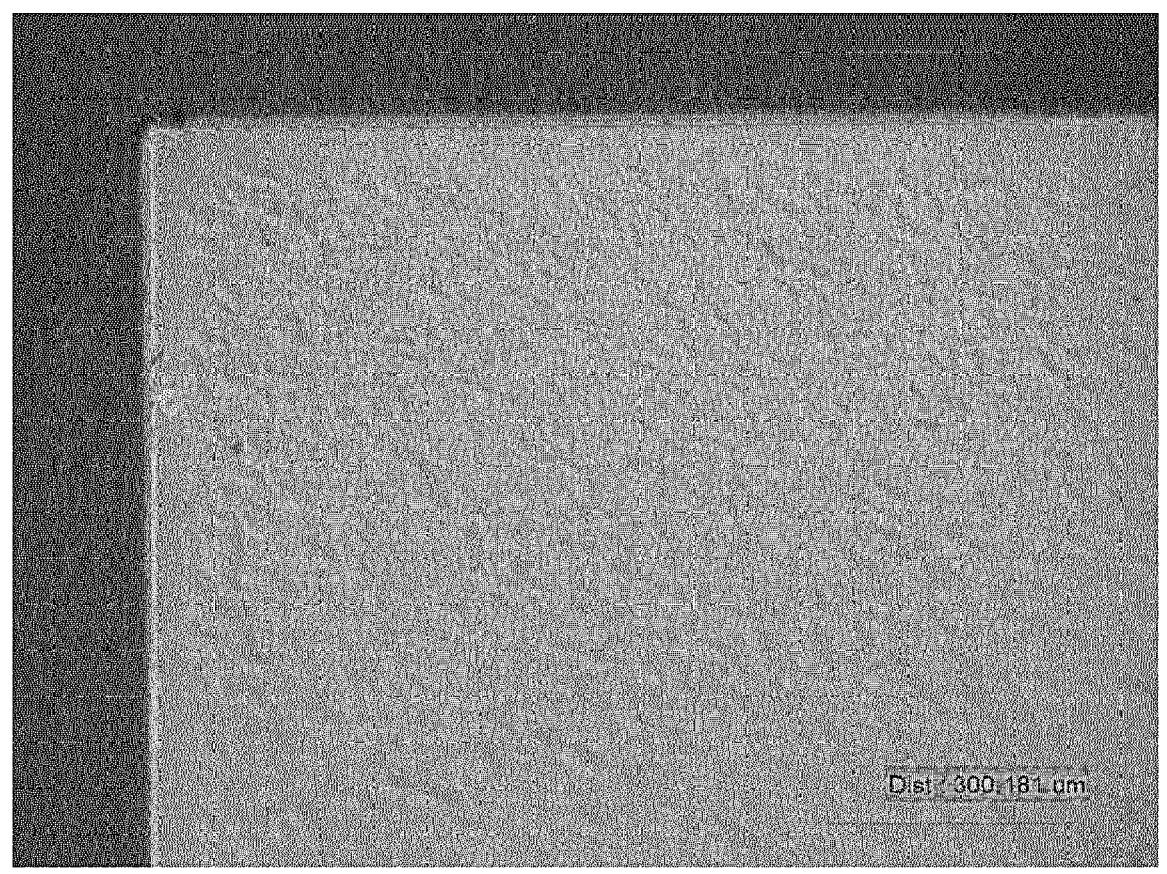
FIGS. 6A and 6B are photographs of a glass according to an embodiment of the present invention using a polarizing microscope.
Figure 6B:
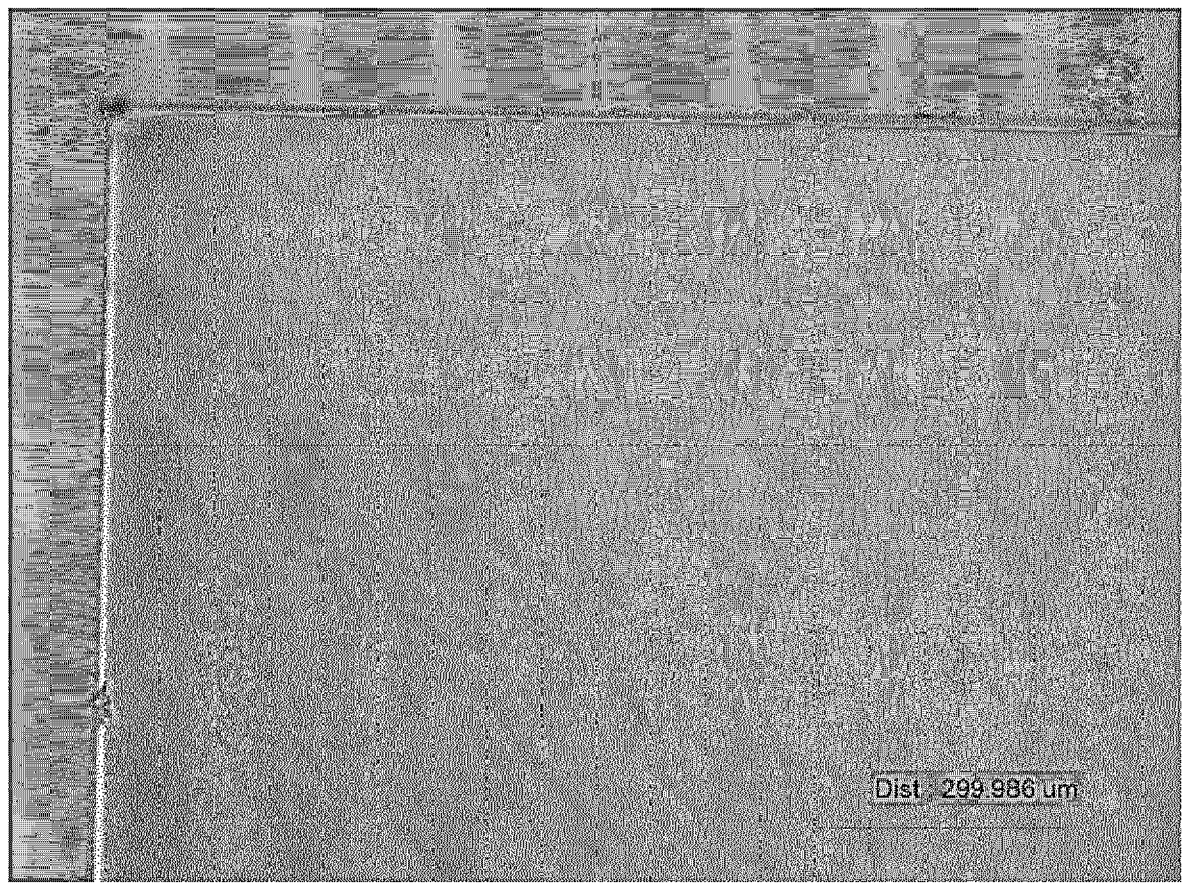

FIGS. 6A and 6B are photographs of a glass according to an embodiment of the present invention using a polarizing microscope. FIGS. 6A and 6B are polarizing microscope images after applying the slurry prepared by adding $TiO_2$: $KNO_3$ at a mass ratio of 60:40 to 40 ml of a water solvent, drying the slurry at room temperature and 60% humidity, conducting ion exchange heat treatment at 440° C. for 15 minutes, and removing the coating film, and it may be clearly seen that irregular roughness (i.e., visual internal roughness) appears on the front of the ion-exchanged region.

Figure 7A:
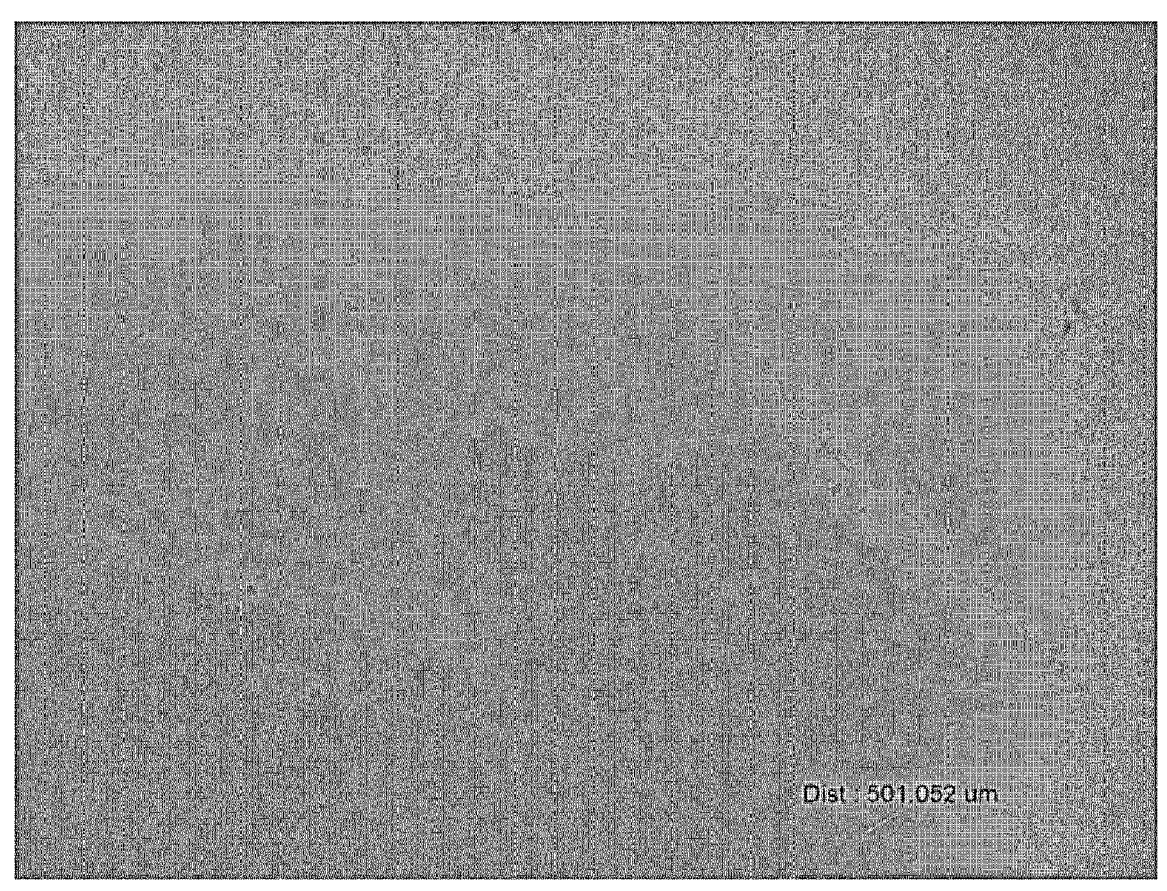
FIGS. 7A and 7B are images photographing a glass according to an embodiment of the present invention using a general microscope and a polarizing microscope, respectively, which correspond to a case where there are small visual internal roughness and dimples.
Figure 7B:

FIGS. 7A and 7B are images photographing a glass according to an embodiment of the present invention using a general microscope and a polarizing microscope, respectively, which correspond to a case where there are dimples. In detail, FIGS. 7A and 7B are general microscope and polarizing microscope images of a glass which is applied with the slurry prepared by adding $TiO_2$:$KNO_3$ at a mass ratio of 60:40 to 40 ml of a water solvent, dried at room temperature and 60% humidity, and then heat-treated for ion exchange at 440° C. for 20 minutes to remove the coating film. Referring to FIGS. 7A and 7B, no change in surface roughness was confirmed in the general microscope image. However, when observing mainly the dimple, it was confirmed that surface curvature appeared under the polarizing microscope.

Example 2. Visual Internal Roughness Changes According to Changes in Surface Composition (SEM)

The slurry was applied onto the glass film to show a significant difference in the composition of alkali ions depending on the glass surface region, and the visual internal roughness was formed differently by changing at least one of a composition of the slurry, a drying temperature, and a humidity condition during drying.

Figure 8A:
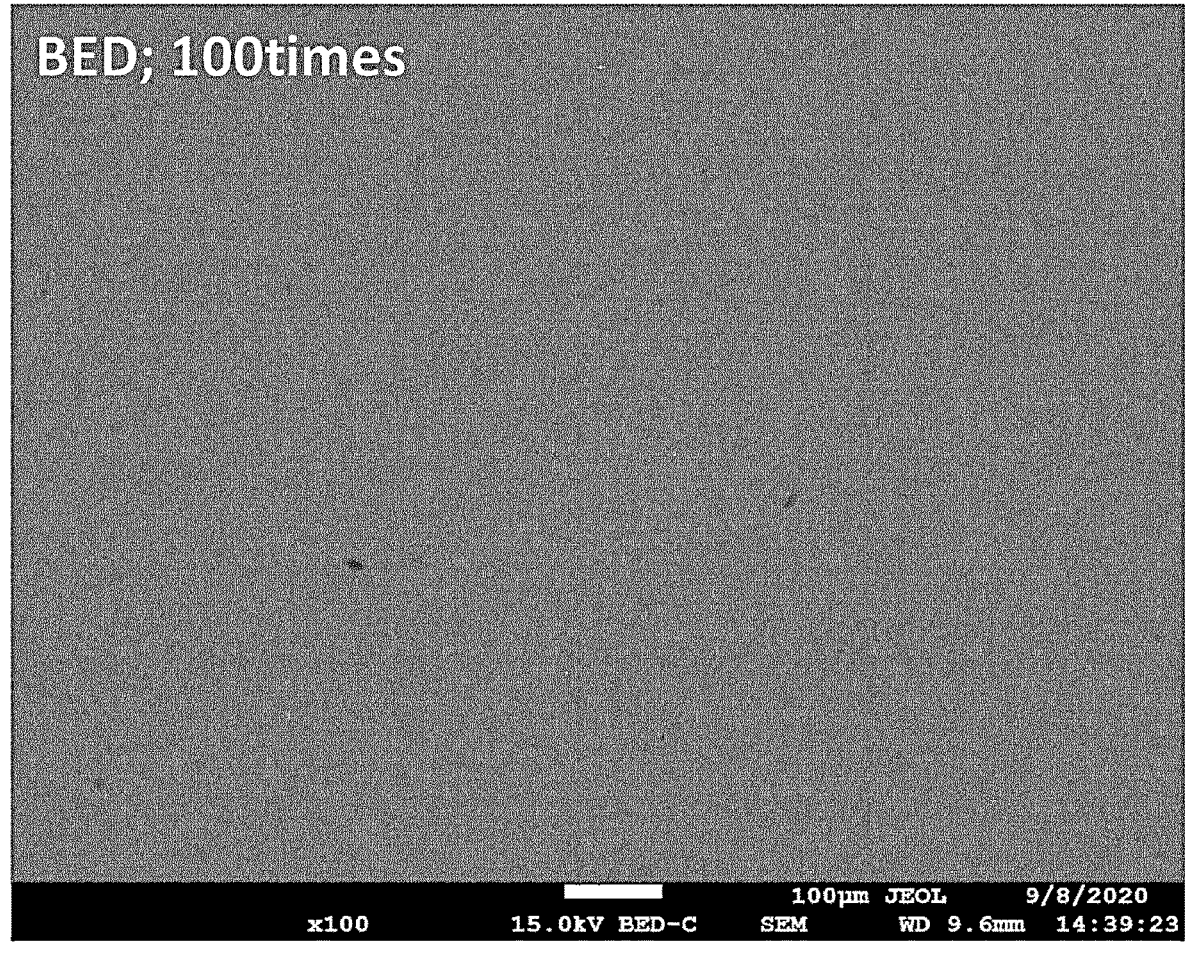
FIGS. 8A and 8B are backscattered electron detector (BED) images of a scanning electron microscope (SEM) showing a glass manufactured to have small visual internal roughness in an embodiment of the present invention, and show an atomic distribution more than the shape of the surface.
Figure 8B:
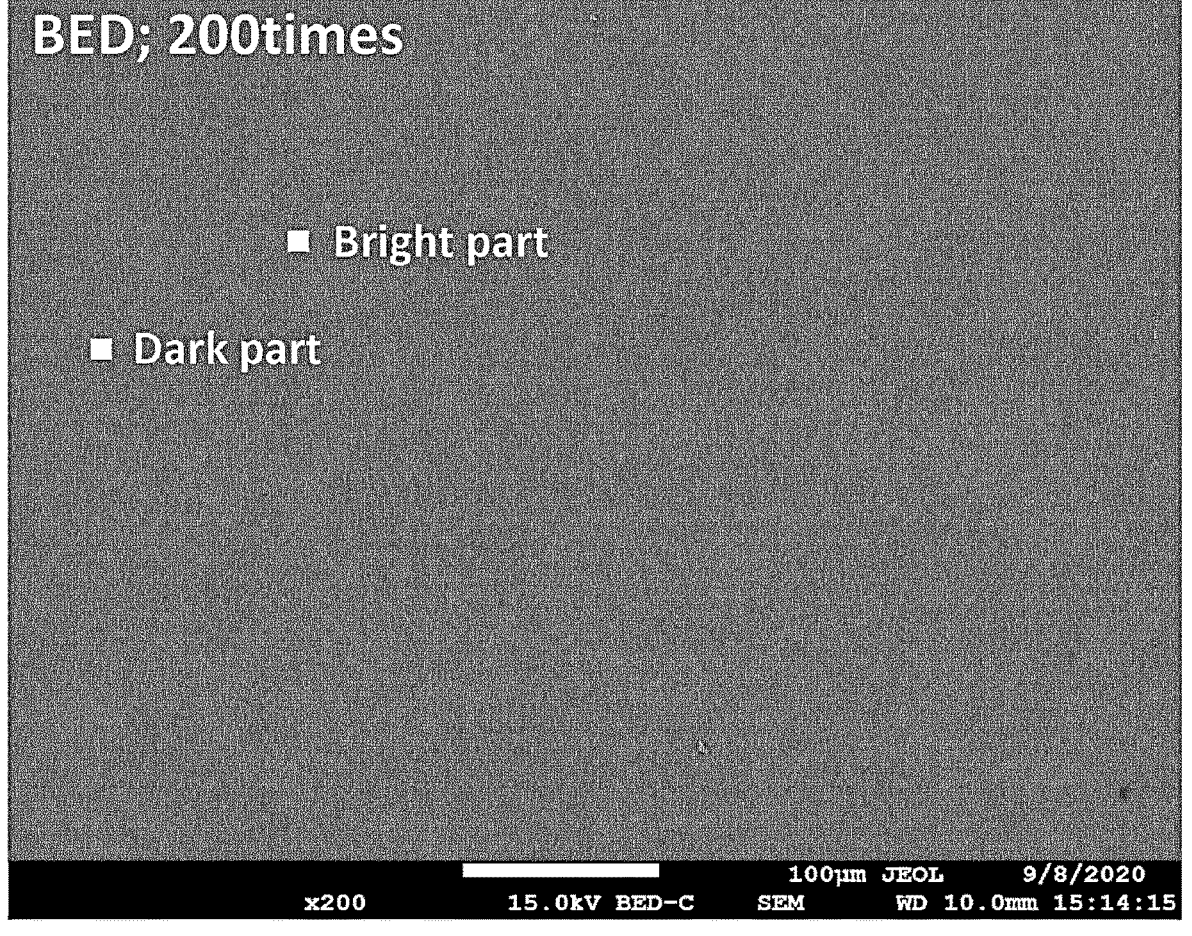

FIGS. 8A and 8B are BED images of SEM showing a glass manufactured to have small visual internal roughness in an embodiment of the present invention. In detail, a slurry prepared by adding $TiO_2$:$KNO_3$ at a mass ratio of 60:40 to 40 ml of a water solvent was used, dried at room temperature and 60% humidity, and then heat treated at 440° C. for 11 minutes. In the case of BED images, changes in surface components may be confirmed, and it may be seen that a difference in contrast appears due to differences in components at specific locations (i.e., different concentration distributions of each component).

As may be seen in FIGS. 8A and 8B, a change was not clearly visible at 100 times, and was found to be confirmed only when the magnification was increased, and visual internal roughness was observed at 200 times.

Referring to the drawing, bright and dark parts may be seen in the image, which corresponds to a difference in contrast due to differences in components. The dark part is a region with relatively high Na, and the bright part is a region with relatively high K.

In FIGS. 8A and 8B, the slurry/paste was prepared by controlling the precipitation amount of an alkali salt, and as a result, the components of the dark and light parts were adjusted as shown in Tables 1 and 2 below. The precipitation amount of the alkali salt in the slurry/paste was performed by controlling the conditions for forming the coating film, and details regarding the formation of the coating film will be described in the following Examples.

As a result of the review, the dark part corresponded to a region with relatively high Na, and the bright part corresponded to a region with relatively high K.

TABLE 1

| Element | wt % | at % |
|---|---|---|
| O | 50.24 | 63.60 |
| Na | 7.13 | 6.28 |
| Mg | 1.73 | 1.45 |
| Al | 9.00 | 6.75 |
| Si | 26.54 | 19.14 |
| K | 5.36 | 2.78 |
| Total: | 100.00 | 100.00 |

TABLE 2

| Element | wt % | at % |
|---|---|---|
| O | 50.01 | 63.96 |
| Na | 5.21 | 4.64 |
| Mg | 1.70 | 1.43 |
| Al | 8.84 | 6.71 |
| Si | 26.03 | 18.97 |
| K | 8.21 | 4.30 |
| Total: | 100.00 | 100.00 |

Figure 9A:
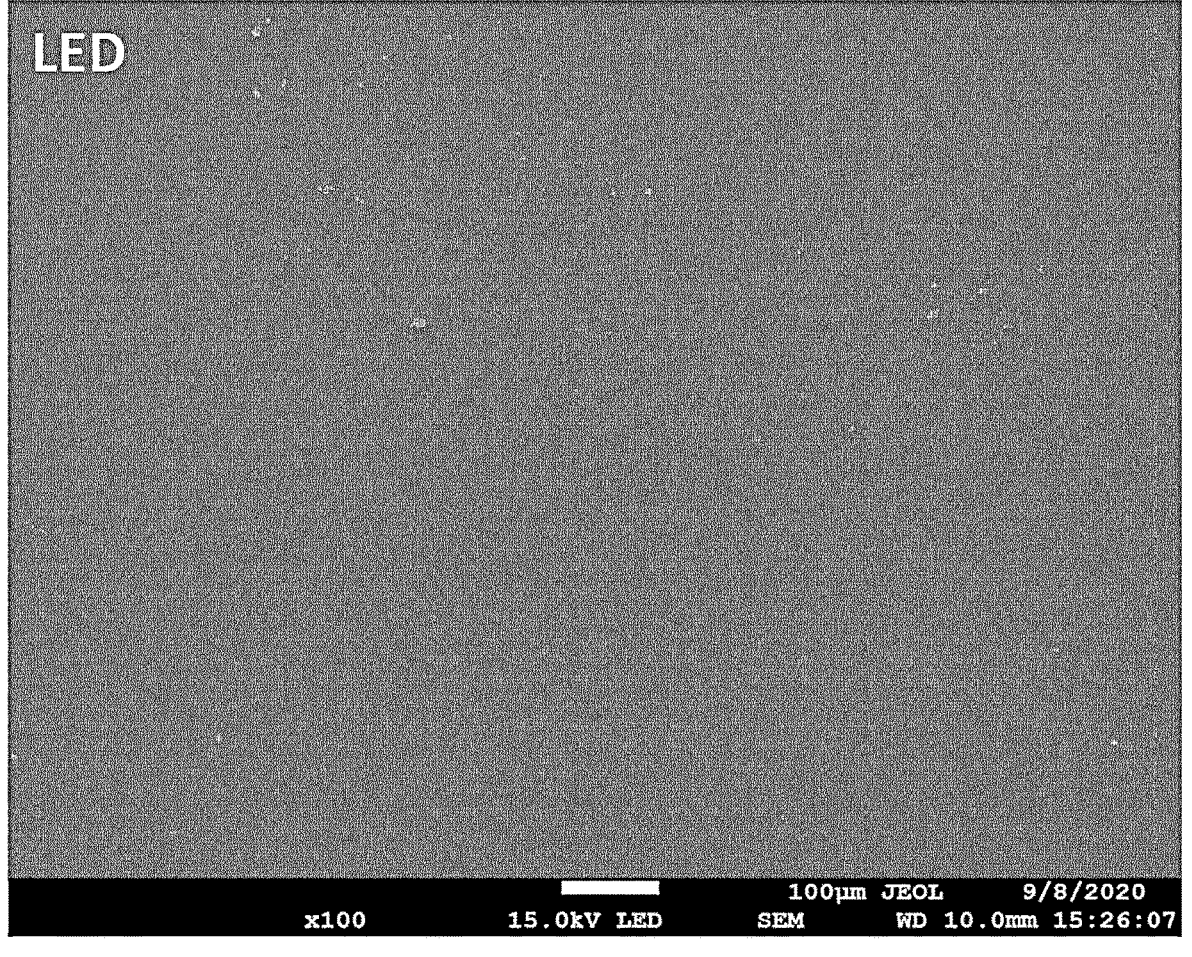
FIGS. 9A and 9B are lower electron detector (LED) and BED images of the SEM showing a glass manufactured to have medium visual internal roughness in an embodiment of the present invention, and show a shape of the surface and an atomic distribution, respectively.
Figure 9B:
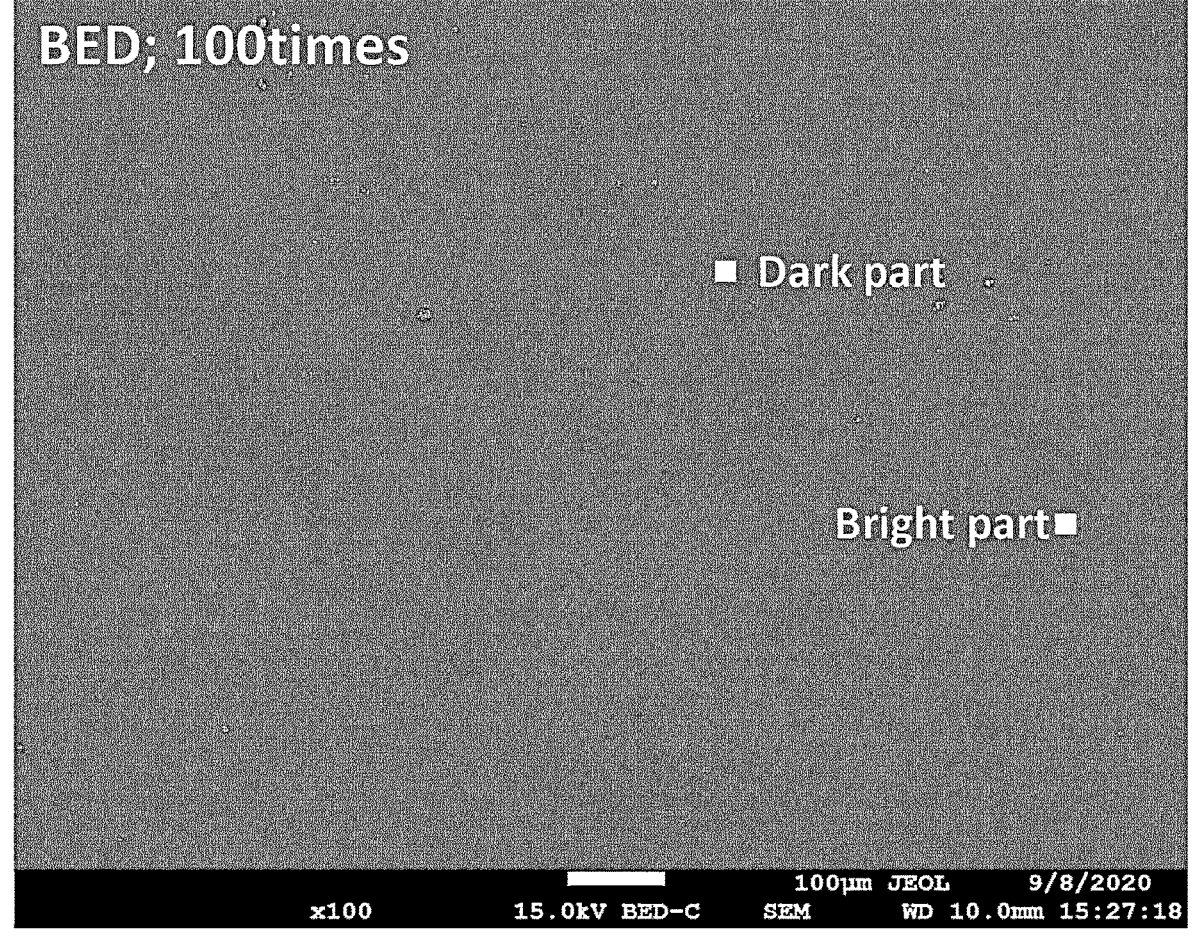

FIGS. 9A and 9B are LED and BED images of SEM showing a glass manufactured to have medium visual internal roughness in an embodiment of the present invention. In detail, a slurry prepared by adding $TiO_2$:$KNO_3$ at a mass ratio of 60:40 to 50 ml of a water solvent was used, dried at room temperature and 60% humidity, and then heat treated at 440° C. for 11 minutes. Referring to FIGS. 9A and 9B, the same surface shows different shapes depending on a type of image or detector. In the case of LED images, the surface morphology may be confirmed, showing characteristics that are sensitive to surface roughness. As may be seen in FIG. 9A, the glass according to an embodiment of the present invention showed a change in surface height, and no change in surface roughness other than impurities present on the surface occurred. In the case of BED images, changes in surface components could be confirmed, and differences in components at specific locations could be confirmed. In FIGS. 9A and 9B, the glass was prepared by controlling the precipitation amount of the alkali salt in the slurry, and as a result, the components of the dark and light parts were adjusted as shown in Tables 3 and 4 below.

TABLE 3

| Element | wt % | at % |
|---|---|---|
| O | 51.05 | 63.98 |
| Na | 7.15 | 6.24 |

TABLE 3-continued

| Element | wt % | at % |
|---|---|---|
| Mg | 1.79 | 1.48 |
| Al | 9.44 | 7.01 |
| Si | 27.90 | 19.92 |
| K | 2.67 | 1.37 |
| Total: | 100.00 | 100.00 |

TABLE 4

| Element | wt % | at % |
|---|---|---|
| O | 50.15 | 64.13 |
| Na | 4.72 | 4.20 |
| Mg | 1.69 | 1.43 |
| Al | 8.92 | 6.76 |
| Si | 26.37 | 19.21 |
| K | 8.15 | 4.27 |
| Total: | 100.00 | 100.00 |

Figure 10A:
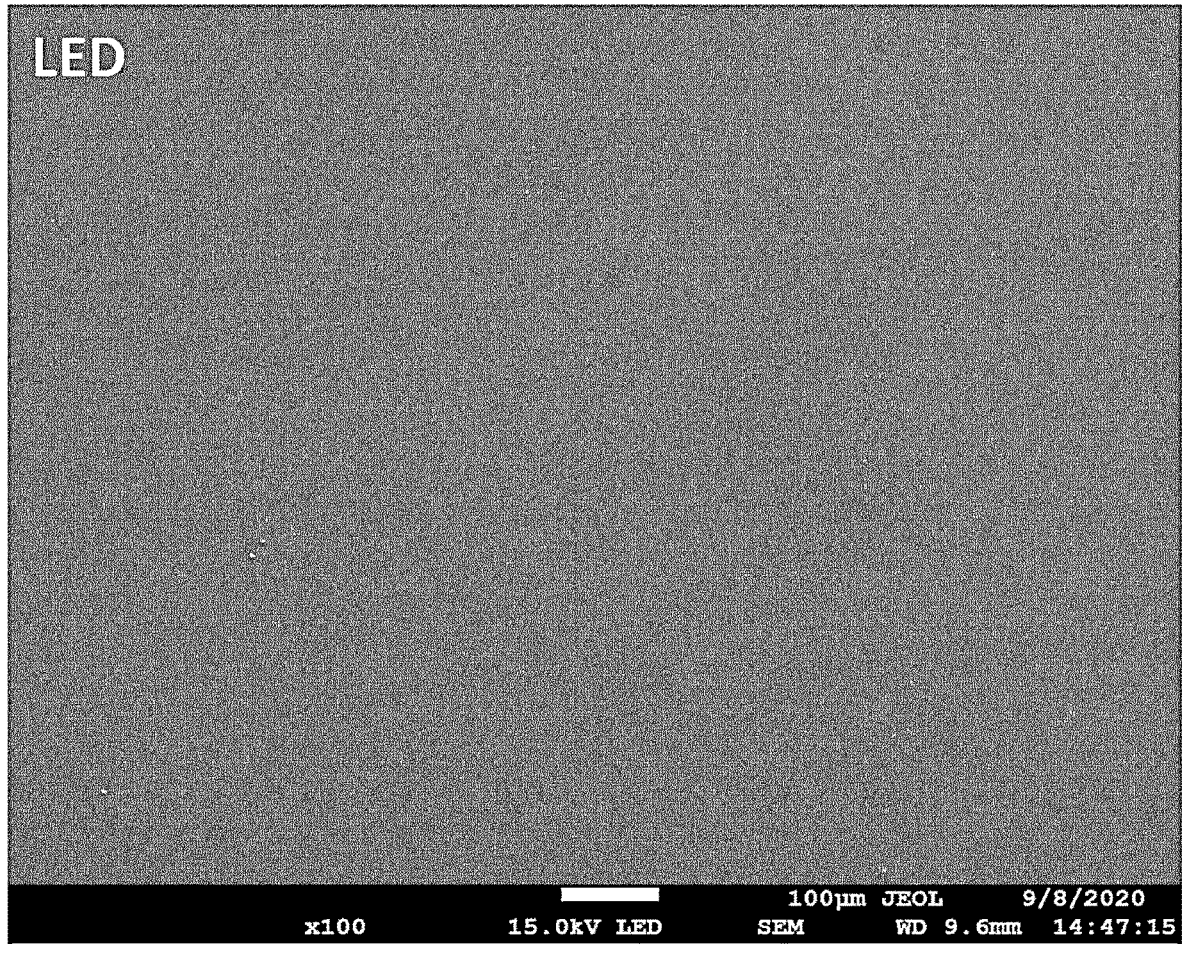
FIGS. 10A and 10B are LED and BED images of SEM showing a glass manufactured to have large visual internal roughness in an embodiment of the present invention, respectively.
Figure 10B:
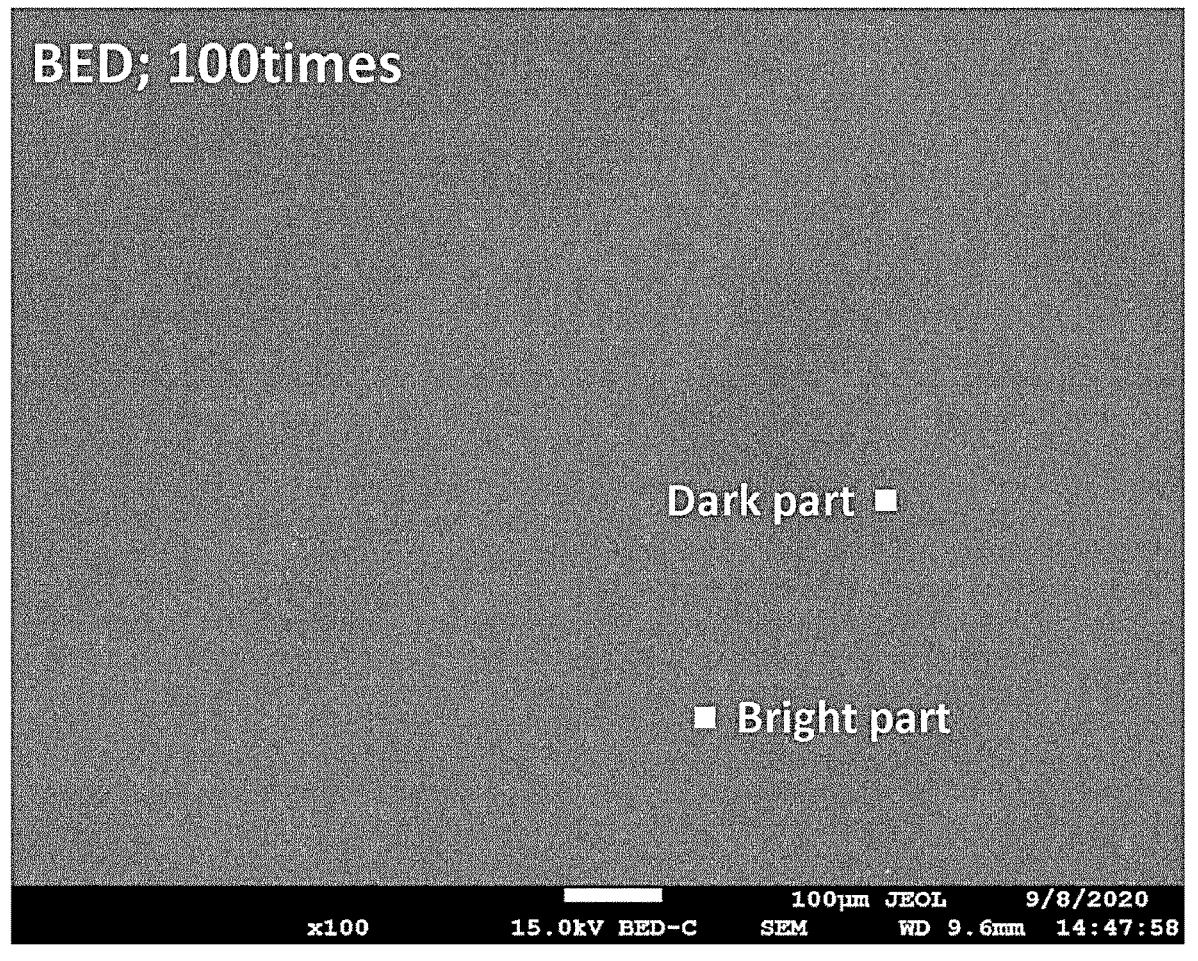

Referring to FIGS. 8A and 8B and FIGS. 9A and 9B, it may be confirmed that although the drying temperature and humidity were the same, a difference in size with small visual internal roughness and medium visual internal roughness occurs by varying the slurry composition, specifically, the water content ratio. FIGS. 10A and 10B are LED and BED images of SEM showing a glass manufactured to have large visual internal roughness in an embodiment of the present invention, respectively. In detail, the slurry prepared by adding $TiO_2$:$KNO_3$ at a mass ratio of 60:40 to 100 ml of water solvent was placed at room temperature to precipitate $TiO_2$, applied with the precipitated sludge from which about 50 ml of the solvent was removed, dried at room temperature at a humidity level of 60%, and then heat-treated for ion exchange at 440° C. for 11 minutes. Referring to FIGS. 10A and 10B, in the case of the LED image, there was a large difference in surface contrast, which could be seen as a clear difference in components, but it was determined that there was no actual change in height. In the case of BED images, changes in surface components could be confirmed, and differences in components at specific locations could be confirmed.

In FIGS. 10A and 10B, the glass was prepared by controlling the precipitation amount of the alkali salt in the slurry, and as a result, the components of the dark and light parts were adjusted as shown in Tables 5 and 6 below.

TABLE 5

| Element | wt % | at % |
|---|---|---|
| O | 51.69 | 65.19 |
| Na | 5.44 | 4.78 |
| Mg | 1.70 | 1.41 |
| Al | 8.83 | 6.60 |
| Si | 26.39 | 18.96 |
| K | 5.94 | 3.07 |
| Total: | 100.00 | 100.00 |

TABLE 6

| Element | wt % | at % |
|---|---|---|
| O | 50.84 | 64.89 |
| Na | 4.27 | 3.79 |
| Mg | 1.73 | 1.45 |

TABLE 6-continued

| Element | wt % | at % |
|---|---|---|
| Al | 8.66 | 6.55 |
| Si | 25.80 | 18.76 |
| K | 8.71 | 4.55 |
| Total: | 100.00 | 100.00 |

Referring to FIGS. 9A and 9B and FIGS. 10A and 10B, it may be confirmed that although the drying temperature and humidity were the same, a difference in size with medium visual internal roughness and large visual internal roughness occurs by varying the slurry composition. In the above-described experimental results, small visual internal roughness occurred with a difference in K and Na components depending on a location on both sides and the surface, averaging between 0.1 at % and 1 at %, and when observed under a polarizing microscope, there was a similar tendency in the range of 100×100 μm or less. The medium visual internal roughness occurred with a difference in K and Na components depending on a location on both sides and the surface, averaging between more than 1 at % and less than 2 at %, and when observed under a polarizing microscope, there was a similar tendency in the range of more than 100×100 μm and less than 300×300 μm. The large visual internal roughness occurred with a difference in K and Na components depending on a location on both sides and the surface, which was 2 at % or more, and when observed under a polarizing microscope, there was a similar tendency in the range of 300×300 μm or more.

Example 3. Visual Internal Roughness Changes According to Changes in Surface Components (Surface EDS)

In addition to the LED image, EDS mapping analysis was performed on a chemically tempered glass in which components of a coating film were adjusted according to an embodiment of the present invention. In detail, a slurry prepared by adding $TiO_2$:$KNO_3$ at a mass ratio of 60:40 to 100 ml of a water solvent was applied, dried at room temperature and 60% humidity, and heat-treated at 300° C. for 6 hours. Even though the same conditions are used, it was confirmed that the coating film was optionally formed so that the thickness and quality of the formed film varied depending on the location during coating (normal spraying, long-term spraying, multiple spraying), thereby generating a simple chemical tempering effect according to a conventional invention, visual internal roughness, and dimples.

Figure 11:
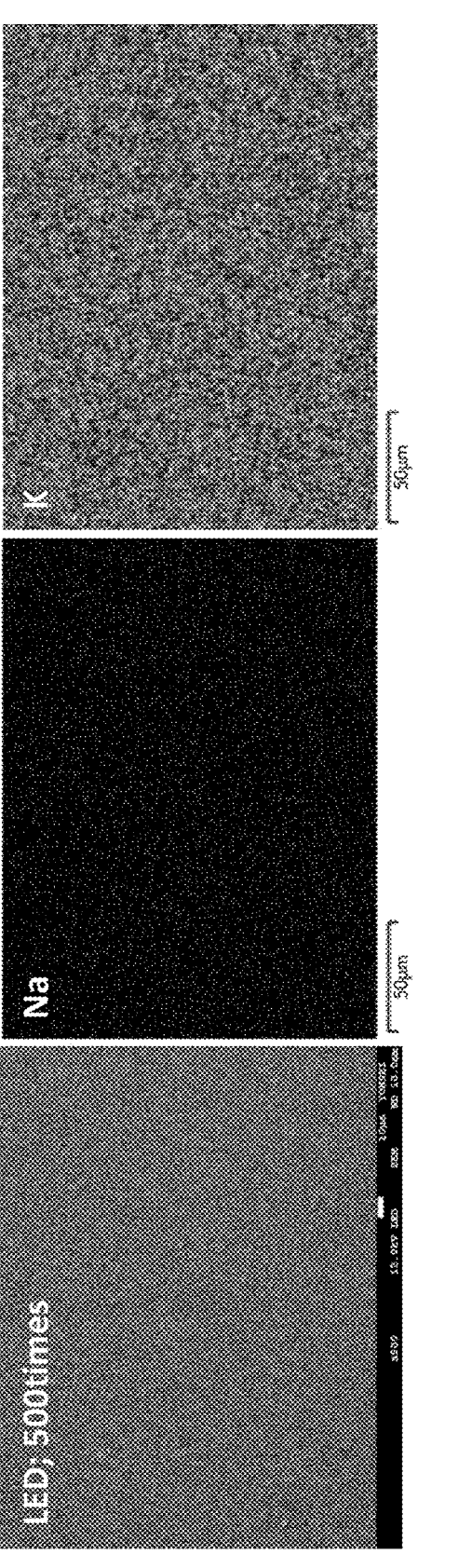
FIG. 11 is an energy dispersive spectroscopy (EDS) analysis image of a glass surface manufactured to be the same as the surface of a simple chemically tempered glass according to a conventional invention.
Figure 12:
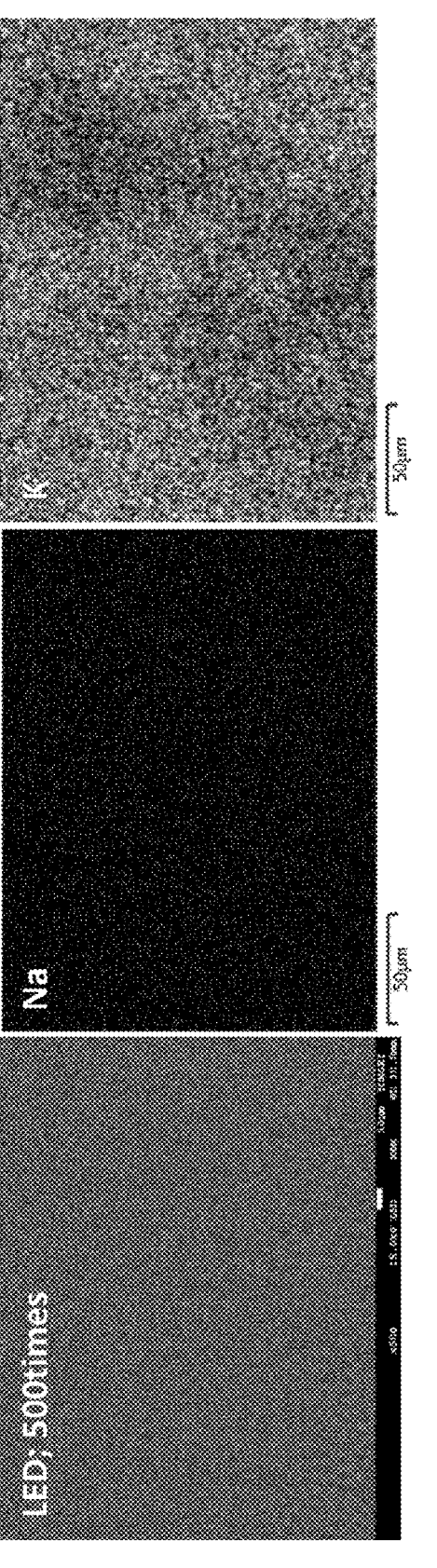
FIG. 12 is a surface EDS analysis image of a chemically tempered glass according to an embodiment of the present invention.
Figure 13:
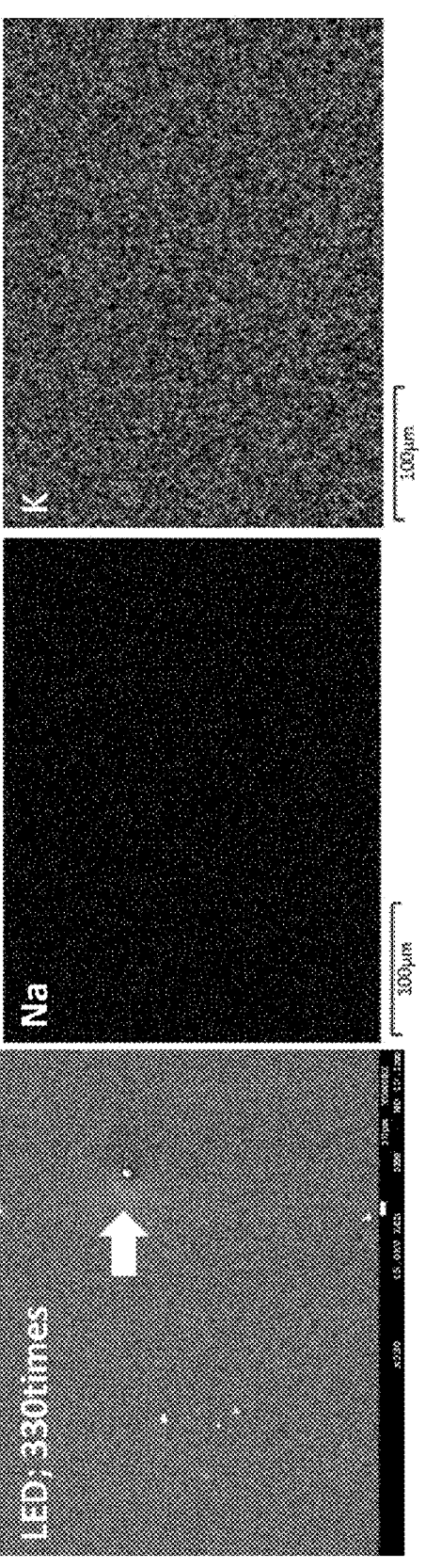
FIG. 13 is a surface EDS analysis image of a chemically tempered glass according to a conventional invention with a dimple.

FIG. 11 is an EDS analysis image of a glass surface manufactured to be the same as the surface of a simple chemically tempered glass according to a conventional invention, FIG. 12 is a surface EDS analysis image of a chemically tempered glass according to an embodiment of the present invention, and FIG. 13 is a surface EDS analysis image of a chemically tempered glass with a dimple according to an embodiment of the present invention.

Referring to FIG. 11, no change in surface height was observed in the LED image except for impurities. As a result of EDS surface analysis, it was confirmed that there was almost no difference in Na and K components.

Referring to FIG. 12, it was confirmed that in the case of the glass surface according to an embodiment of the present invention, there was no change in height in the LED image.

However, unlike the surface of the glass according to a convention invention, in the case of the surface of the glass according to an embodiment of the present invention, it was confirmed that a difference in contrast in the image appeared significantly, so that the difference in Na and K components was large.

Referring to FIG. 13, the surface height was observed in the dimple portion of the LED image. However, as a result of EDS analysis, it was confirmed that there was no change in surface component. Through this, it was confirmed that even if a dimple was formed on the surface, the dimple had little effect on the change in surface components and did not affect the difference in internal roughness.

Example 4. Visual Internal Roughness Changes According to Changes in Surface Components (Cross-Sectional EDS Analysis)

LED image and EDS mapping analysis were performed on a cross section of a chemically tempered glass according to an embodiment of the present invention to determine whether changes in surface composition affected visual internal roughness. In detail, the glass was the same as a glass with controlled large, medium, and small visual internal roughness shown in Example 2, and FIG. 15D shows that a slurry prepared by adding $TiO_2:KNO_3$ at a mass ratio of 60:40 to 40 ml of a water solvent was applied on one of the two sides of the glass, dried at room temperature and 30% humidity, and then heat-treated at 440° C. for 11 minutes.

Figure 14:
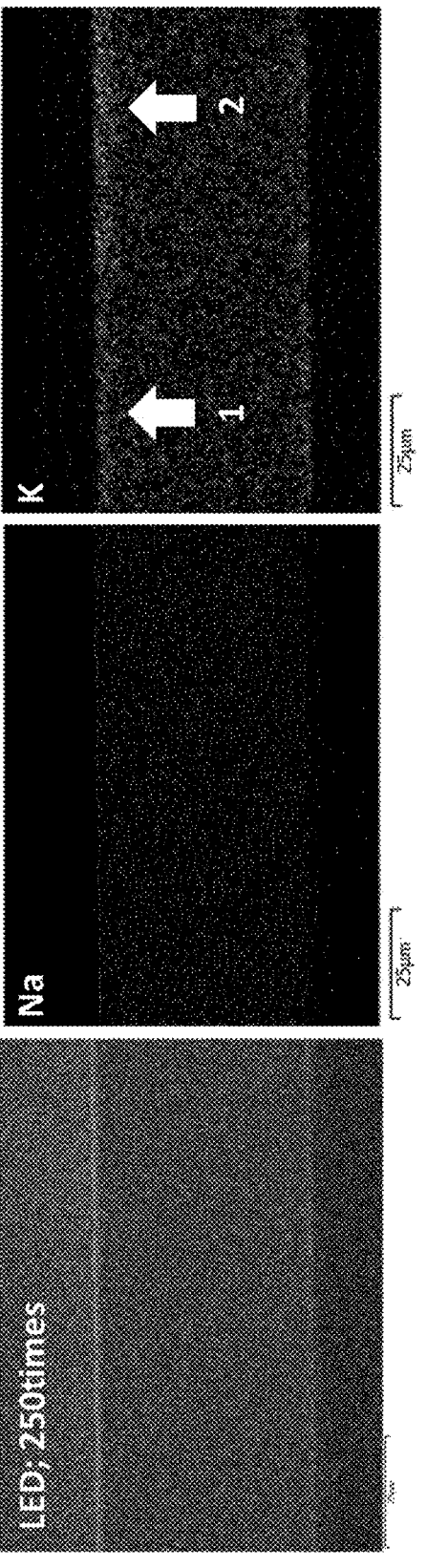
FIG. 14 is a cross-sectional LED image and an EDS mapping analysis result obtained after forming large visual internal roughness on a glass according to an embodiment of the present invention.

FIG. 14 is a cross-sectional LED image and an EDS mapping analysis result obtained after forming large visual internal roughness on a glass according to an embodiment of the present invention.

Referring to FIG. 14, it was confirmed that there was no change in surface height in the LED image. Differences in cross-sectional components may be confirmed by changes in contrast in the image as a result of EDS analysis, and it was confirmed that Na and K components were formed differently depending on a location. In particular, it was confirmed that at location 1, ion exchange between Na and K occurred at a relatively shallow location from the surface, but at location 2, ion exchange between Na and K occurred at a deeper location than location 1.

Figure 15A:
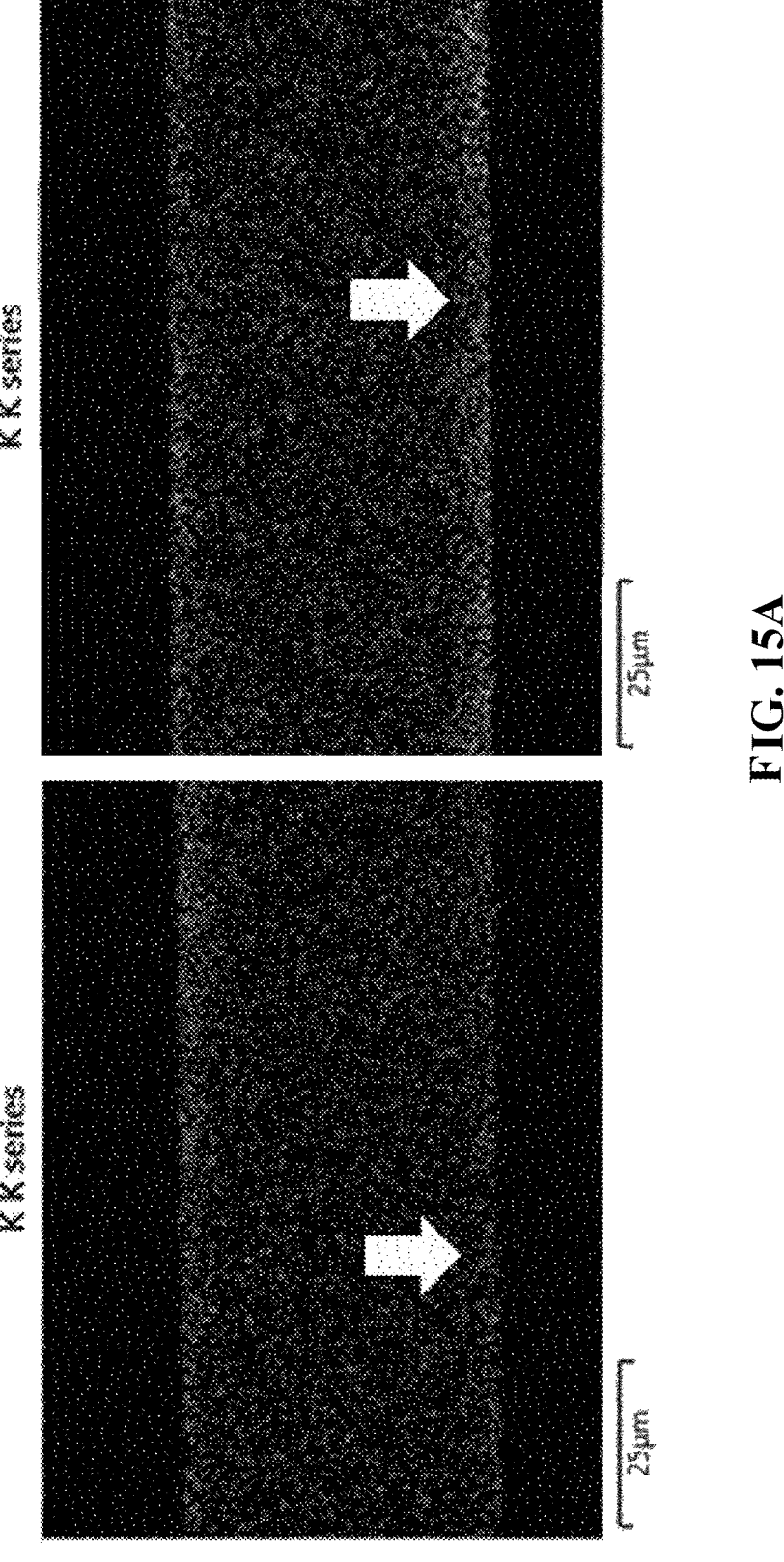
Figure 15B:
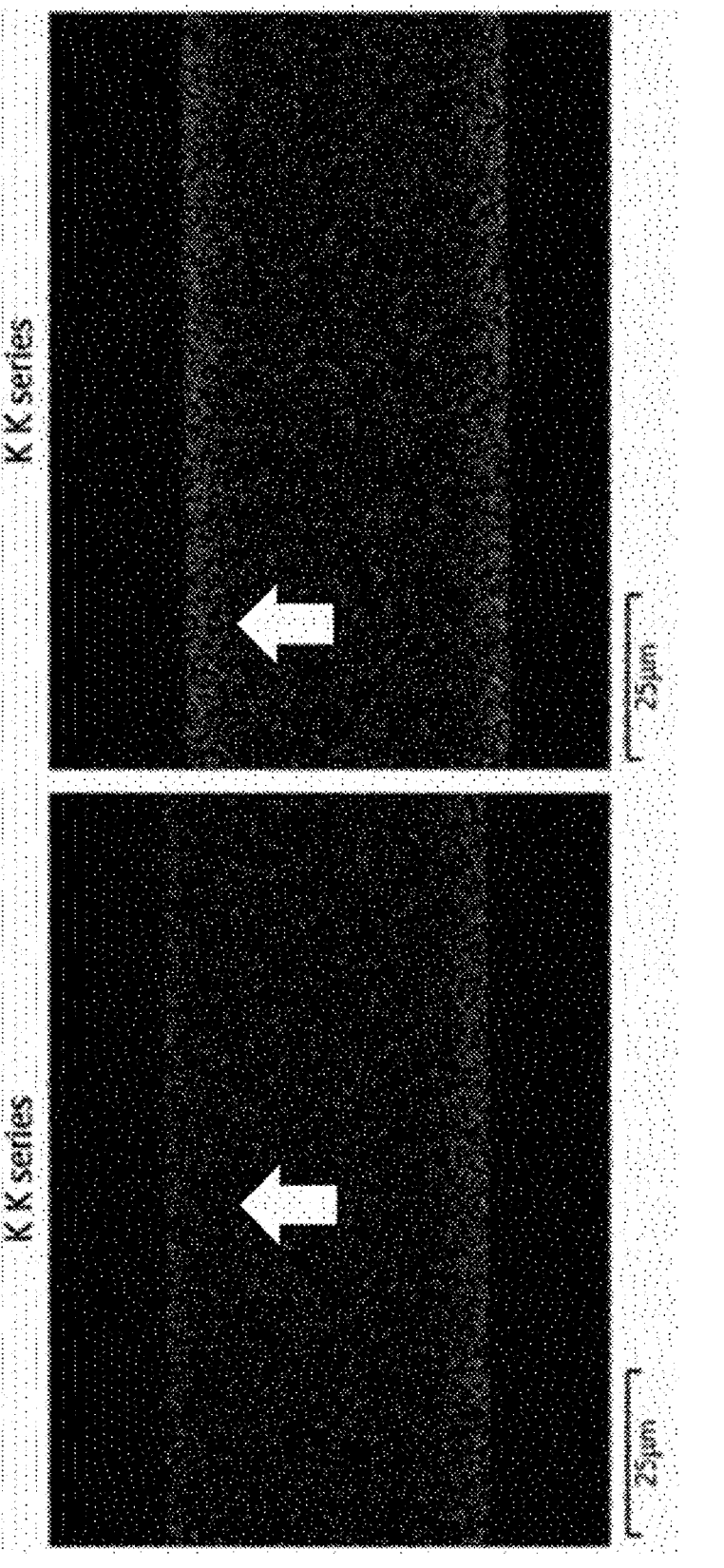
Figure 15C:
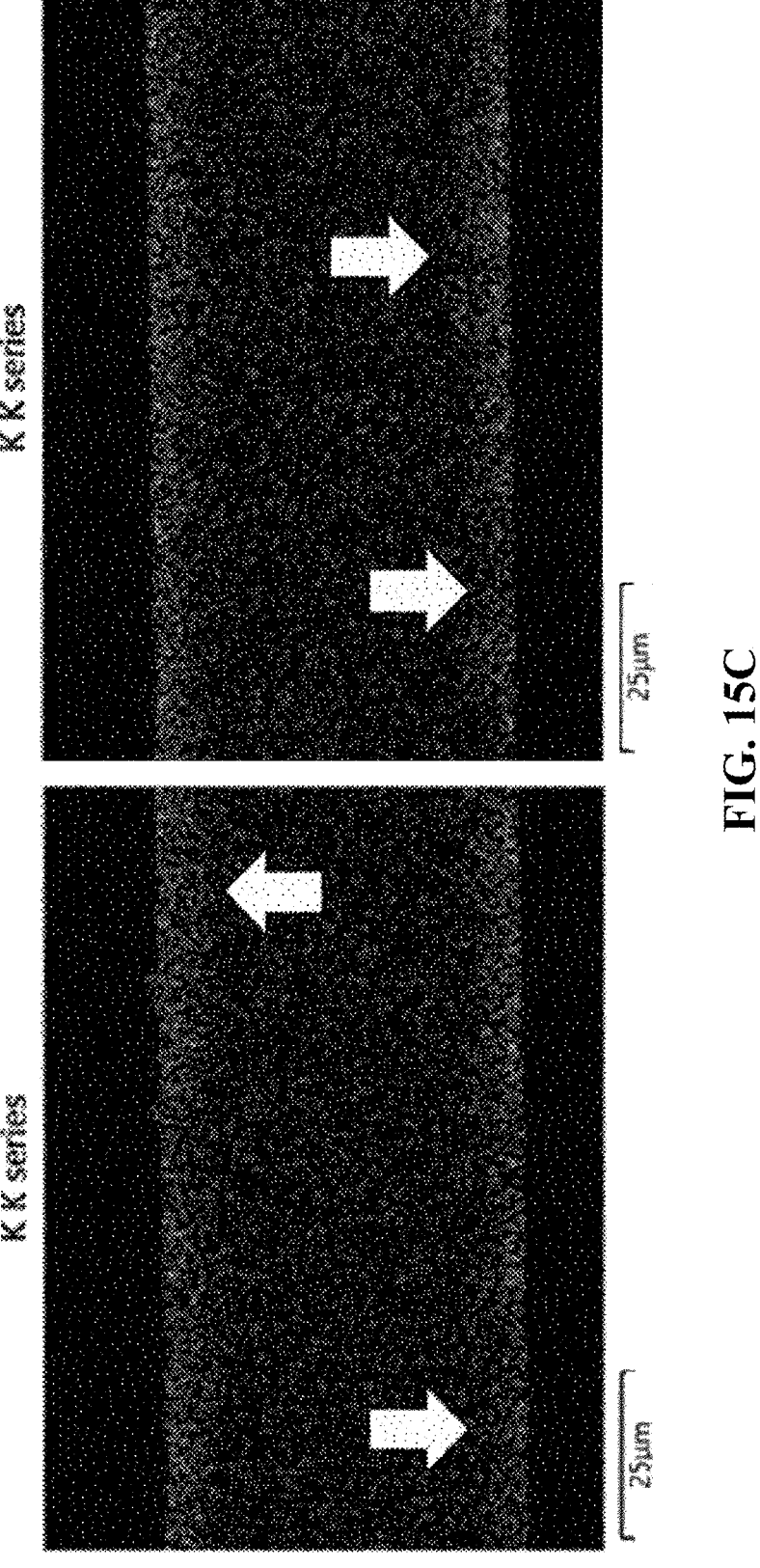
Figure 15D:
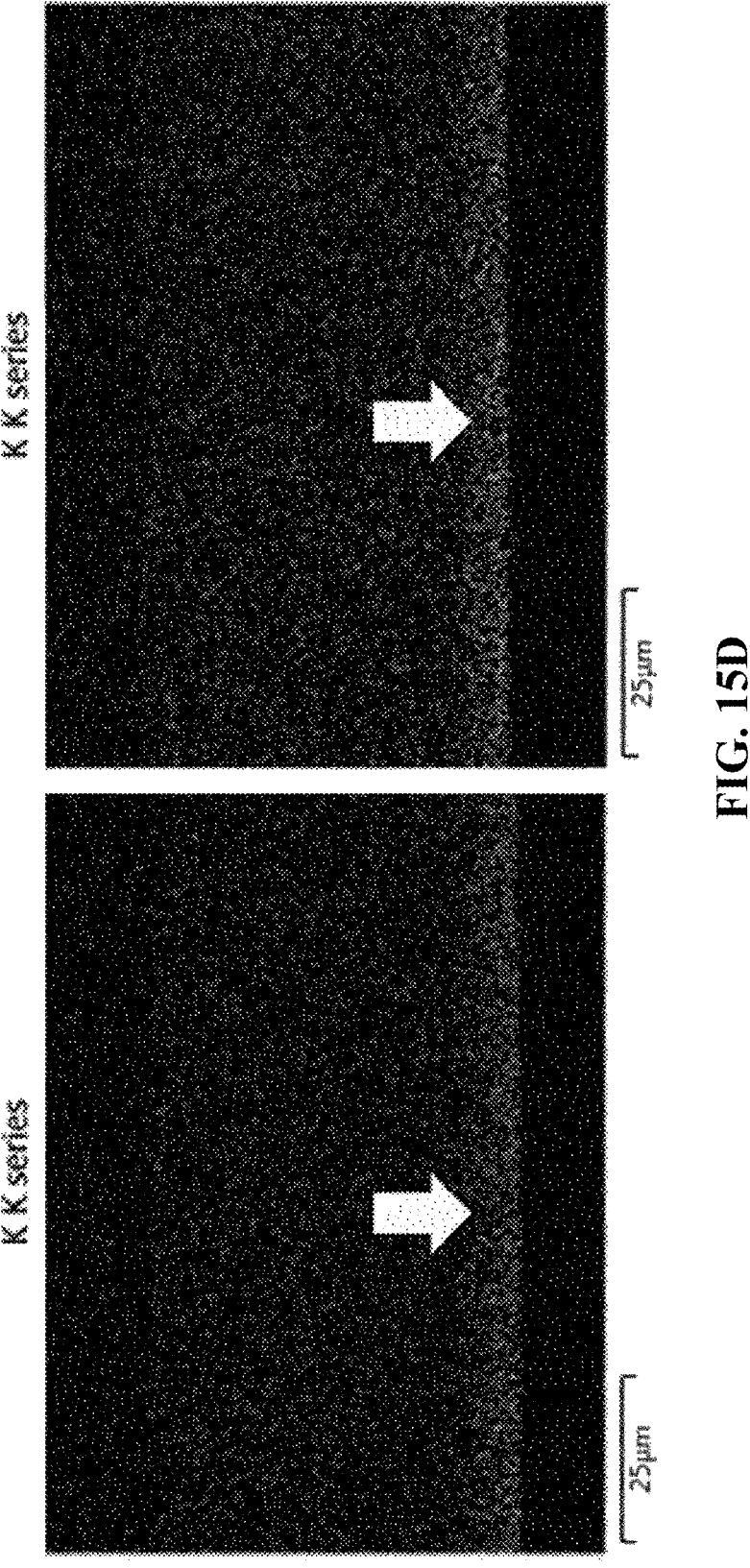

FIGS. 15A to 15C are cross-sectional EDS mapping analysis results magnified by 250 times after forming a chemically tempered glass according to an embodiment of the present invention to have large visual internal roughness, medium visual internal roughness, and small visual internal roughness, respectively. FIG. 15D is a 250 times cross-sectional EDS mapping analysis result of a surface subjected to chemical tempering according to a conventional invention when tempering one side of two sides of the glass.

Referring to FIGS. 15A to 15D, it may be seen that the color contrast changes in the cross section according to the size of visual internal roughness in the same specimen, and the content of the K component for each location may be confirmed through this change in contrast. The difference in contrast occurred the largest depending on the location in a glass, which had large visual internal roughness. In the case of a glass having small visual internal roughness, it was not seem to be a significant difference depending on a location, but since the glass was imaged at a low magnification, it was determined that it would be possible to confirm the difference by further increasing the magnification. When tempering one side of the glass, there was no difference in the content of K component depending on a location on the chemically tempered surface.

Example 5. Visual Internal Roughness Changes According to Changes in Surface Components (Cross-Sectional EDS Analysis and Component Concentration Analysis)

K content analysis was performed according to a cross-sectional location to confirm a change in components depending on a depth of the cross section of the chemically tempered glass according to an embodiment of the present invention. In detail, the large visual internal roughness, medium visual internal roughness, and one side of the glass shown in Example 2 and Example 4 are the same as the chemically tempered glass.

FIGS. 16A and 16B are graphs showing an EDS mapping analysis result and a K content analysis result according to a depth after forming a chemically tempered glass according to an embodiment of the present invention to have large visual internal roughness and medium visual internal roughness, respectively. FIG. 16C is a graph showing an EDS mapping analysis result and a K content analysis result according to a depth for a cross section which is chemically tempered according to a conventional invention when tempering one side of a glass.

Referring to FIGS. 16A to 16C, it may be seen that the content of K changes depending on a depth from one surface to the other surface, and that K ions are exchanged at different depths depending on a location on the surface. In the case of a glass with visible internal roughness, there was a great difference in overall depth of layer (DOL) and K content depending on the location. In other words, depending on the location, the distribution was diverse, such as some parts having high K content and large DOL, others having low K content and small DOL, etc. In comparison, in the case of the glass according to a conventional invention, chemical tempering was performed without visual internal roughness, the DOL was uniform at about 10 μm, and the surface K content was constant.

Example 6. Formation of Coating Film and Observation of Coating Film

It was confirmed that the degree of visual internal roughness was adjusted by forming a coating film by changing the composition of the slurry and/or paste for the chemically tempered glass according to an embodiment of the present invention, or by forming the coating film and then processing the coating film.

FIG. 17 is an image photographing a contact surface of a glass having a coating film containing a salt of an ion to be exchanged when manufacturing a chemically tempered glass according to a conventional invention. In detail, a slurry prepared by adding $TiO_2:KNO_3$ at a mass ratio of 29:71 to 100 ml of a water solvent was used, and dried at room temperature and 30% humidity.

Referring to FIG. 17, it may be seen that before heat treatment, the size of a $KNO_3$ precipitated phase is very small and the distance therebetween is narrow, and it may be confirmed that after heat treatment (under conditions of 425° C. and 20 minutes), the temperature drops to room temperature after $KNO_3$ melts and spreads, and thus $KNO_3$ is precipitated again. The dark part in FIG. 17 was determined to be $KNO_3$.

FIG. 18 is the same specimen as FIG. 17 and an image when a glass having a coating film containing a salt of an ion to be exchanged when manufacturing a chemically tempered glass according to a conventional invention is heat-treated for ion exchange at 425° C. for 20 minutes and then a glass surface from which the coating film is removed is observed through with a polarizing microscope.

Referring to FIG. 18, when observed with a polarizing microscope, it was confirmed that there was almost no difference in refractive index depending on a location, which corresponded to visual flatness similar to that of a conventional dipping method.

FIG. 19 is an image photographing a contact surface of a glass having a coating film containing a salt of an ion to be exchanged when manufacturing a chemically tempered glass according to an embodiment of the present invention, which corresponds to a surface of the glass when forming small visual internal roughness. In detail, a slurry prepared by adding $TiO_2$:$KNO_3$ at a mass ratio of 46:54 to 40 ml of a water solvent was used, and dried at room temperature and 50% humidity.

Referring to FIG. 19, it may be seen that by adjusting the drying conditions (temperature: room temperature, relative humidity: 30% or more), before heat treatment, the length of the $KNO_3$ precipitated phase was lengthened, the ratio of $KNO_3$ in contact with the surface was reduced, and the distance between the contact surfaces was widened. After heat treatment, it may be seen that $KNO_3$ melted and spread, but did not cover the entire glass but covered unevenly the glass.

FIG. 20 is an image through a polarizing microscope when observing a surface of a glass having a coating film containing a salt of an ion to be exchanged when manufacturing a chemically tempered glass according to an embodiment of the present invention and subjected to heat treatment of ion exchange, which is the same as the glass in FIG. 19, but corresponds to a glass from which the coating film is removed by heat treatment for ion exchange at 425° C. for 20 minutes after drying.

Referring to FIG. 20, when observed with a polarizing microscope, it may be seen that there is a clear difference in refractive index depending on a location.

FIG. 21 is an image photographing a contact surface of a glass having a coating film containing a salt of an ion to be exchanged when manufacturing a chemically tempered glass according to an embodiment of the present invention, which corresponds to the surface of the glass when forming large visual internal roughness. In detail, a slurry prepared by adding $TiO_2$:$KNO_3$ at a mass ratio of 46:54 to 40 ml of a water solvent was used, and dried at high temperature and humidity of 10%, so that the glass according to this Example was dried at 50° C. or higher when forming the coating film.

Referring to FIG. 21, it may be seen that by changing the drying conditions (temperature: 50° C. or higher), before heat treatment, the $KNO_3$ precipitated phase was long and in a very little contact with the surface, and the distance between the contact surfaces was very wide. In addition, it may be seen that after heat treatment, a part where $KNO_3$ melted and spread appears irregularly in a very large range.

Referring to FIGS. 18 and 20, 20 and 21, the distribution of the $KNO_3$ precipitated phase may be adjusted by adjusting the content ratio of $KNO_3$ and $TiO_2$ inside the slurry and drying conditions (adjusting a drying time by controlling the temperature and relative humidity), respectively, which means that the size of the visual internal roughness may be adjusted. When these conditions were satisfied, changes appeared on the polarizing microscope and small or large visual internal roughness was confirmed.

Example 7. Observation of Changes in Glass Surface Roughness

In order to determine whether chemical tempering according to an embodiment of the present invention induces roughness on the external surface of the glass, the glass surface roughness was observed according to a condition.

FIGS. 22A and 22B are images photographing a cross section when setting a chemically tempered region and a non-tempered region in a glass specimen, and performing chemical tempering for only the tempered region according to an embodiment of the present invention. Here, FIG. 22A corresponds to a glass with small visible internal roughness and FIG. 22B corresponds to a glass with medium visible internal roughness. In detail, FIG. 22A corresponds to a glass in which a slurry prepared by adding $TiO_2$:$KNO_3$ at a mass ratio of 60:40 to 40 ml of a water solvent was used, dried at room temperature and 60% humidity, and then heat-treated at 425° C. for 15 minutes, and FIG. 22B corresponds to a glass in which a slurry having the same composition and heat treatment conditions were used, but the humidity was increased to 80% in dry conditions.

Referring to FIGS. 22A and 22B, the same heat treatment temperature (425° C.) and time (15 minutes) were performed, but the non-tempered surface did not have a coating film, so that the glass was the same as a pristine glass even after heat treatment, and the tempered surface had visual internal roughness. However, even in any case, no change in actual surface roughness change occurred.

FIG. 23 is a diagram showing external surface roughness to be confirmed at once when chemical tempering is performed according to a conventional invention and an embodiment of the present invention, which is an image showing each glass specimen with surface roughness according to visual internal roughness.

Referring to FIG. 23, surface roughness due to changes in the size of visual internal roughness was hardly observed, and even if there were some roughness changes, it was confirmed that there was no significant difference compared to the surface roughness of the cleanly tempered specimen.

Example 8. Observation of Changes in Boundary Line Between Tempered and Non-Tempered Surfaces During Chemical Tempering It was observed whether a boundary line between tempered and non-tempered surfaces was visible during partial chemical tempering according to an embodiment of the present invention.

FIG. 24 is general microscope and polarizing microscope images photographing a boundary between a tempered surface and a non-tempered surface when chemical tempering was performed according to a conventional invention and FIG. 25 is general microscope and polarizing microscope images photographing a boundary between a tempered surface and a non-tempered surface in a glass with small visual internal roughness when performing chemical tempering according to an embodiment of the present invention. In detail, in FIG. 24, a slurry prepared by adding $TiO_2$:$KNO_3$ at a mass ratio of 60:40 to 40 ml of a water solvent was used, dried at room temperature and 30% humidity, and then heat-treated at 425° C. for 15 minutes, and FIG. 25 corresponds to a glass manufactured under the same conditions as FIG. 22A.

Referring to FIG. 24, a boundary line occurs due to a difference in refractive index between the tempered surface and the non-tempered surface, and was observed in a polarization mode.

Referring to FIG. 25, no difference occurred in glass specimens with visual internal roughness when observed with a general microscope. In contrast, when observed with a polarizing microscope, it was confirmed that undulation did not occur on the non-tempered surface, but the undulation occurred on the tempered surface, and the boundary line according to the presence or absence of undulation could be confirmed. In the case of undulation that appeared due to polarizing microscopic observation, it was confirmed that a local refractive index difference occurred due to a change in internal roughness rather than a change in actual surface roughness.

The invention claimed is:

1. A method for manufacturing a chemically tempered glass, comprising:
preparing a slurry or paste containing a salt of a second ion to be ion-exchanged with a first ion inside a glass;
applying the slurry or paste onto a surface of the glass to form a coating film;
drying the coating film formed of the slurry or paste on the surface of the glass;
differently forming a distribution of a precipitated phase of the salt of the second ion on the surface of the glass; and
heat-treating the glass on which the coating film is formed to form a textured structure which is disposed between a first surface and a second surface facing each other on the glass to induce diffuse reflection and/or scattering of light traveling through the first surface or the second surface,
wherein the textured structure is formed by controlling a diffusion of the second ion to be ion-exchanged with the first ion, and corresponds to a boundary between a diffusion region where the second ion is diffused and a non-diffusion region where the second ion is not diffused.

2. The method for manufacturing the chemically tempered glass of claim 1, wherein the distribution of the precipitated phase of the salt of the second ion is adjusted by at least one of a composition of the slurry or paste, a drying temperature of the coating film formed of the slurry or paste, a drying humidity of the coating film formed of the slurry or paste, a drying time of the coating film formed of the slurry or paste, a heat treatment temperature, or a heat treatment time.

3. The method for manufacturing the chemically tempered glass of claim 1, wherein the boundary has a non-uniform uneven shape.

4. The method for manufacturing the chemically tempered glass of claim 1, wherein a depth from the first surface or the second surface of the diffusion region has a non-uniform value depending on a location.

5. The method for manufacturing the chemically tempered glass of claim 1, wherein at least one of the first surface or the second surface has a flat surface.

6. The method for manufacturing the chemically tempered glass of claim 5, wherein the textured structure has a texture that is not parallel to the flat surface.

7. The method for manufacturing the chemically tempered glass of claim 1, wherein a refractive index of the glass has different values at two different points where the textured structure is different.

8. The method for manufacturing the chemically tempered glass of claim 7, wherein the refractive index of the glass varies at a plurality of points where the textured structure is different.

9. The method for manufacturing the chemically tempered glass of claim 1, wherein the salt of the second ion is $KNO_3$.

10. The method for manufacturing the chemically tempered glass of claim 1, wherein the slurry or paste further includes at least one of metal oxide particles or a viscosity modifier.

11. A chemically tempered glass, comprising:
a first surface and a second surface facing each other; and
a textured structure that is disposed between the first surface and the second surface to induce diffuse reflection and/or scattering of light traveling through the first surface or the second surface,
wherein a second ion is ion-exchanged with a first ion inside a glass, and the textured structure corresponds to a boundary between a diffusion region where the second ion is diffused and a non-diffusion region where the second ion is not diffused.

12. The chemically tempered glass of claim 11, wherein the chemically tempered glass has a difference in component between the first ion and/or the second ion included inside the glass according to a location between the first surface and the second surface.

13. The chemically tempered glass of claim 12, wherein a concentration difference between a plurality of first ions at different locations on the first surface and/or the second surface is 0.1 at % or more, and a concentration difference between a plurality of second ions at different locations on the first surface and/or the second surface is 0.1 at % or more.

14. The chemically tempered glass of claim 12, wherein at least one of the first surface or the second surface has a flat surface, and the textured structure has a texture that is not parallel to the flat surface.

15. The chemically tempered glass of claim 11, wherein a refractive index of the glass has different values at two different points where the textured structure is different.

16. The chemically tempered glass of claim 15, wherein the refractive index of the glass varies at a plurality of points where the textured structure is different.

17. The chemically tempered glass of claim 11, wherein the boundary has an irregular shape and has unevenness.

18. The chemically tempered glass of claim 11, wherein a depth of the diffusion region from the first surface or the second surface has a non-uniform value depending on a location.

* * * * *